United States Patent
Pino, Jr. et al.

(10) Patent No.: US 10,165,330 B2
(45) Date of Patent: Dec. 25, 2018

(54) TEMPLATE BASED SYSTEM, DEVICE AND METHOD FOR PROVIDING INTERACTIVE CONTENT

(71) Applicant: YOUR CHOICE INTERACTIVE, INC., New York City, NY (US)

(72) Inventors: Angelo J. Pino, Jr., New York, NY (US); Mohammed Sattar, Bell Harbor, NY (US); Peter M. Redling, Greensboro, NC (US)

(73) Assignee: YOUR CHOICE INTERACTIVE, INC., New York, NY (US)

( * ) Notice: Subject to any disclaimer, the term of this patent is extended or adjusted under 35 U.S.C. 154(b) by 0 days.

(21) Appl. No.: 14/859,903

(22) Filed: Sep. 21, 2015

(65) Prior Publication Data
US 2016/0014462 A1 Jan. 14, 2016

Related U.S. Application Data

(63) Continuation of application No. 12/127,602, filed on May 27, 2008, now Pat. No. 9,167,208, which is a
(Continued)

(51) Int. Cl.
*H04N 21/478* (2011.01)
*G06Q 30/02* (2012.01)
(Continued)

(52) U.S. Cl.
CPC ......... *H04N 21/4781* (2013.01); *G06Q 30/02* (2013.01); *H04L 67/22* (2013.01);
(Continued)

(58) Field of Classification Search
CPC ............... H04N 21/436; H04N 21/236; H04N 21/23617; H04N 21/432; H04N 21/668;
(Continued)

(56) References Cited

U.S. PATENT DOCUMENTS 5,524,195 A 6/1996 Clanton et al.
5,532,735 A 7/1996 Blahut et al.
(Continued)

*Primary Examiner* — Benjamin R Bruckart
*Assistant Examiner* — Anthony Bantamoi
(74) *Attorney, Agent, or Firm* — Jeffrey S. Melcher; Manelli Selter PLLC

(57) ABSTRACT

A method and system for providing television programming content and interactive data services is provided. In one embodiment, the interactive content is displayed on the television concurrently with television programming content and facilitates game play between viewers. The game may be scored for each viewer based on selection data from the viewer and event data that is determined by events occurring in the television programming content. In addition, the interactive content may present a message that conveys an incentive to the viewer to take some action such as actuating a button when a particular commercial is presented thereby allowing the service provider and advertisers to determine how many, and which, viewers watched a particular commercial. In addition, the interactive content (including the incentives) can be presented to viewers when the programming content is stored on a digital video recorder and subsequently presented thereby presenting incentives to viewers to watch commercials that were recorded as part of the television programming content.

8 Claims, 33 Drawing Sheets

Related U.S. Application Data continuation-in-part of application No. 11/697,499, filed on Apr. 6, 2007.

(60) Provisional application No. 60/789,932, filed on Apr. 7, 2006.

(51) Int. Cl.

| | |
|---|---|
| *H04N 7/173* | (2011.01) |
| *H04N 21/2543* | (2011.01) |
| *H04N 21/2665* | (2011.01) |
| *H04N 21/475* | (2011.01) |
| *H04N 21/4784* | (2011.01) |
| *H04N 21/4788* | (2011.01) |
| *H04N 21/61* | (2011.01) |
| *H04N 21/81* | (2011.01) |
| *H04N 21/84* | (2011.01) |
| *H04L 29/08* | (2006.01) |
| *H04N 21/258* | (2011.01) |
| *H04N 21/472* | (2011.01) |
| *H04N 21/488* | (2011.01) |
| *H04N 21/8545* | (2011.01) |

(52) U.S. Cl.
CPC .......... *H04L 67/26* (2013.01); *H04L 67/306* (2013.01); *H04N 7/17318* (2013.01); *H04N 21/2543* (2013.01); *H04N 21/25891* (2013.01); *H04N 21/2665* (2013.01); *H04N 21/4758* (2013.01); *H04N 21/4784* (2013.01); *H04N 21/4788* (2013.01); *H04N 21/47205* (2013.01); *H04N 21/4882* (2013.01); *H04N 21/6125* (2013.01); *H04N 21/812* (2013.01); *H04N 21/84* (2013.01); *H04N 21/8545* (2013.01)

(58) Field of Classification Search
CPC ......... H04N 21/26275; H04N 21/4325; H04N 21/4331; H04N 21/4332; H04N 21/4333; H04N 21/4334; H04N 21/4435; H04N 21/485; H04N 21/258; H04N 21/25883; H04N 21/2668; H04N 21/64707; H04N 21/26266; H04N 21/4349; H04N 21/438; H04N 21/443; H04N 21/4436; H04N 21/4437; H04N 21/47208; H04N 21/4852; H04N 21/4858; H04N 21/4335
See application file for complete search history.

(56) References Cited

U.S. PATENT DOCUMENTS

| | | |
|---|---|---|
| 5,579,057 A | 11/1996 | Banker et al. |
| 5,583,560 A | 12/1996 | Florin et al. |
| 5,585,858 A | 12/1996 | Harper |
| 5,673,401 A | 9/1997 | Volk et al. |
| 5,689,562 A | 11/1997 | Hassan et al. |
| 5,724,103 A | 3/1998 | Batchelor |
| 5,734,853 A | 3/1998 | Hendricks et al. |
| 5,754,940 A | 5/1998 | Smith et al. |
| 5,761,606 A | 6/1998 | Wolzien |
| 5,764,276 A | 6/1998 | Martin et al. |
| 5,805,154 A | 9/1998 | Brown |
| 5,828,403 A | 10/1998 | Derodeff et al. |
| 5,903,816 A | 5/1999 | Broadwin et al. |
| 5,915,243 A | 6/1999 | Smolen |
| 5,931,908 A | 8/1999 | Gerba et al. |
| 5,949,476 A | 9/1999 | Pocock et al. |
| 5,953,046 A | 9/1999 | Pocock |
| 6,002,394 A | 12/1999 | Schein et al. |
| 6,005,602 A | 12/1999 | Matthews, III |
| 6,005,606 A | 12/1999 | Nakano |
| 6,006,257 A | 12/1999 | Slezak |
| 6,078,896 A | 6/2000 | Kaehler et al. |
| 6,191,782 B1 | 2/2001 | Mori et al. |
| 6,396,473 B1 | 5/2002 | Callahan et al. |
| 6,505,169 B1 | 1/2003 | Bhagavath et al. |
| 6,760,916 B2 | 7/2004 | Holtz et al. |
| 6,766,524 B1* | 7/2004 | Matheny ............ G06Q 30/0226 348/E7.07 |
| 6,766,526 B1 | 7/2004 | Ellis |
| 7,032,176 B2 | 4/2006 | Gordon et al. |
| 7,058,376 B2 | 6/2006 | Logan et al. |
| 7,103,904 B1 | 9/2006 | Blackketter et al. |
| 7,133,837 B1 | 11/2006 | Barnes, Jr. |
| 7,269,837 B1 | 9/2007 | Redling et al. |
| 8,509,929 B1* | 8/2013 | Hughes ............... G07F 17/3276 463/42 |
| 8,702,504 B1* | 4/2014 | Hughes ............... G06F 3/04842 463/29 |
| 2001/0036865 A1 | 11/2001 | Neal |
| 2002/0012322 A1 | 1/2002 | Rooney |
| 2002/0055871 A1* | 5/2002 | Gabler .................. G06Q 30/02 705/14.14 |
| 2002/0059621 A1 | 5/2002 | Thomas et al. |
| 2002/0059642 A1 | 5/2002 | Russ et al. |
| 2002/0120930 A1 | 8/2002 | Yona |
| 2002/0124252 A1 | 9/2002 | Schaefer et al. |
| 2002/0124255 A1 | 9/2002 | Reichardt et al. |
| 2002/0162117 A1* | 10/2002 | Pearson ................. H04N 5/445 725/109 |
| 2003/0028451 A1 | 2/2003 | Ananian |
| 2003/0163823 A1 | 8/2003 | Logan et al. |
| 2003/0167467 A1 | 9/2003 | Allen et al. |
| 2003/0226152 A1 | 12/2003 | Billmaier et al. |
| 2003/0229900 A1 | 12/2003 | Reisman |
| 2004/0003402 A1 | 1/2004 | McKenna, Jr. |
| 2004/0034561 A1 | 2/2004 | Smith |
| 2004/0117831 A1 | 6/2004 | Ellis et al. |
| 2004/0133468 A1 | 7/2004 | Varghese |
| 2005/0003895 A1* | 1/2005 | Nara ....................... A63F 13/12 463/42 |
| 2005/0015796 A1 | 1/2005 | Bruckner et al. |
| 2005/0136949 A1 | 6/2005 | Barnes, Jr. |
| 2005/0193411 A1 | 9/2005 | Funston |
| 2006/0080717 A1 | 4/2006 | Barzilay et al. |
| 2007/0136742 A1 | 6/2007 | Sparrel |
| 2007/0136777 A1 | 6/2007 | Hasek |
| 2009/0019485 A1 | 1/2009 | Ellis et al. |

* cited by examiner

Figure 7

TEMPLATE BASED SYSTEM, DEVICE AND METHOD FOR PROVIDING INTERACTIVE CONTENT

CROSS REFERENCE TO RELATED APPLICATIONS

This application is a continuation-in-part of, and claims priority to, U.S. patent application Ser. No. 11/697,499 filed Apr. 6, 2007, which claims priority to U.S. Patent Application No. 60/789,932 filed Apr. 7, 2006, which are incorporated herein by reference in their entirety.

FIELD OF THE INVENTION

The present invention generally relates to an interactive television system and method. Specifically, various embodiments of the present invention provide complementary interactive content for video content such as television programming.

BACKGROUND OF THE INVENTION

With the advent of Digital Television (DTV) comes the ability to create interactive TV (ITV) programming. The "old" analogue set-top box cable units are being phased out and replaced by more robust digital units. Digital cable head-ends and their supporting infrastructure have made it possible to create and deploy TV applications. These applications allow the viewer to purchase movies on demand, record TV programs, etc.

Television broadcast and cable systems have largely been broadcast systems in which all the users receive the same content and cannot interact with the received content. However, it would be desirable to combine interactive content with television programming to allow the user to receive content with which the user can interact. In addition, by making the interactive content supplementary to the television programming, it may be possible to increase the number of users who watch the televisions program.

In many instances users who are watching a television program often consider the commercials as an opportunity to visit the bathroom, leave the viewing area to get food, or perform some other task other than watching the commercial. Additionally, many users record television programming with a digital video recorder (e.g., Tivo®) and later watch the programming at the user's convenience. When watching a recorded program, many users simply fast forward through the commercials without watching them. Consequently, it would be desirable to provide the uses with an incentive to watch the commercials.

In addition, with broadcast systems, advertisers who purchase slots for television commercials have no means of knowing how many users watched their commercial. Consequently, it would be desirable to provide to provide advertisers with an indication of the number of users (and which users) watched their commercials.

One or more embodiments of the present invention may provide these and other advantages over the prior art.

SUMMARY OF THE INVENTION

The present invention provides a method and system for providing television programming content and interactive data services. In one embodiment, the interactive content is displayed on the television concurrently with television programming content and facilitates game play between viewers. The game may be scored for each viewer based on selection data from the viewer and event data that is determined by events occurring in the television programming content. In addition, the interactive content may present a message that conveys an incentive to the viewer to take some action such as actuating a button when a particular commercial is presented thereby allowing the service provider and advertisers to determine how many, and which, viewers watched a particular commercial. In addition, the interactive content (including the incentives) can be presented to viewers when the programming content is stored on a digital video recorder and subsequently presented thereby presenting incentives to viewers to watch commercials that were recorded as part of the television programming content.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings:

FIG. 7 illustrates an example interface for managing interactive content according to an example embodiment of the present invention;

DETAILED DESCRIPTION OF ILLUSTRATIVE EMBODIMENTS

In the following description, for purposes of explanation and not limitation, specific details are set forth, such as particular networks, communication systems, set top boxes, cable television systems, computers, terminals, devices, components, techniques, data and network protocols, software products and systems, operating systems, development interfaces, hardware, etc. in order to provide a thorough understanding of the present invention.

However, it will be apparent to one skilled in the art that the present invention may be practiced in other embodiments that depart from these specific details. Detailed descriptions of well-known networks, set top boxes, cable television systems, communication systems, computers, terminals, devices, components, techniques, data and network protocols, software products and systems, operating systems, development interfaces, and hardware are omitted so as not to obscure the description of the present invention.

System Architecture and General Design Concepts

The present invention provides a system and method for providing complementary (or supplementary) interactive content for video content such as television programming content. The complementary interactive content may, among other things, (1) increase the audience for a television program by making the program (in combination with the interactive content) more enjoyable to watch, (2) provide an incentive to viewers to watch commercials, (3) provide an indication of the number of viewers watching a program and/or commercial, and/or (4) provide an indication as to which customers watched a program and/or commercial.

Figure 1:
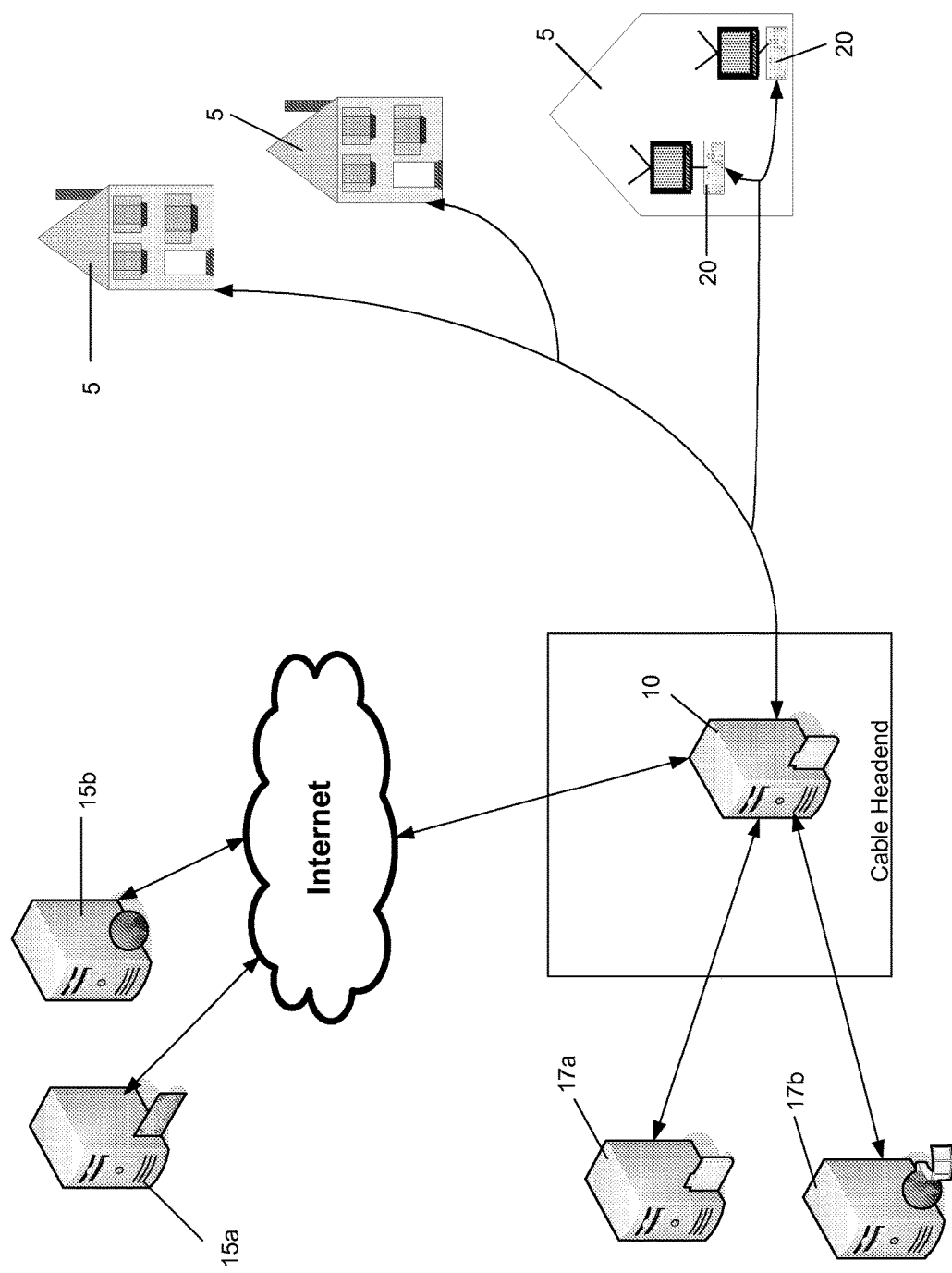
FIG. 1 illustrates a network implementing an example embodiment of the present invention.

As shown in FIG. 1, a server 10, which may be connected to or co-located at the cable provider head-end, may be communicatively coupled to a plurality of set top boxes 20 (located in a plurality of customer premises 5) via the cable provider's telecommunication infrastructure (e.g., coaxial cable network or fiber coaxial hybrid network).

The server 10 may also be coupled to one or more servers 15 via a public communication medium such as the Internet. In addition, the server 10 may be coupled to one on or more servers 17 via a private link (e.g., such as a virtual private network, a PSTN, or via a dedicated communication link). The servers 15 and 17 may supply content (e.g., news, advertisements, interactive content (data and/or HTML screens, etc.) and also be configured to receive and transmit responses to requests (hereinafter referred to as interactive content) from server 10. The interactive content may provide specific information, for example, in response to a request from the server 10 (which may be provided to the server 10 from the user via a user request), of interest to the user. Such specific information may include information related to a television program being viewed by the user, such as, for example, sports information (e.g., statistics (including real-time statistics), box scores, player information, etc.), interactive game data (e.g., the user's score, other players' scores, questions, answers, navigation control messages, messages conveying an incentive to take an action, etc.), investment data (e.g., stock quote/volume), and/or other data.

The server 10 may be a computer system comprising a conventional web server (e.g., serving HTML pages to the set top boxes. 20) and, therefore, include a computer system with a processor, memory, server software, and application software for execution to perform the functions of the present invention. This server 10 may be additional to the computers and equipment normally found at a cable head end. The memory of the server 10 may be co-located with other portions of the computer system or be remote and may be centralized or distributed. The memory of the server 10 may store a plurality of screens (e.g., HTML screen files), advertisements, personal user data, user profile data, demographic user data, set top box identification (ID) information, and other information. For example, in one embodiment, each set top box has a unique identification code (ID) that may be associated with a zipcode (or other location information) and the user profile information of one or more users in a particular household. Each of the one or more users of a set top box may provide user profile information, which may be stored in memory of the server 10 (e.g., in a user database). Requests and other transmissions to the server 10 from the set top boxes 20 may include the set top box ID (which allows the server to determine the location of the user (e.g., either zip code or address) by looking up the set top box ID number in memory). Knowing the location of the user allows for localized advertising or the selection of advertising based on the user's location (e.g., advertisers may pay more to advertise to expensive neighborhoods). In addition, in residences where there is only one user, the set top box ID also allows the server to access the user database to determine the user's profile, ticker, and alert selections for that user. In residences where there are multiple users, the users log on to the network to allow the server to access the user database to determine the user's profile, ticker, and alert selections for that user.

The set top boxes 20 may also include software such as HTML client software (e.g., a browser application) for displaying the screens (e.g., HTML files) transmitted by the server 10 and for transmitting information (e.g., requests, responses, etc.) in response to inputs from the user. In one embodiment, the set top boxes 20 receive user inputs from the user via a remote control although any suitable input device may be used such as a keyboard, mouse, touch screen, etc. The set top box 20 may then transmit information of the input to the server 10.

Figure 2A:
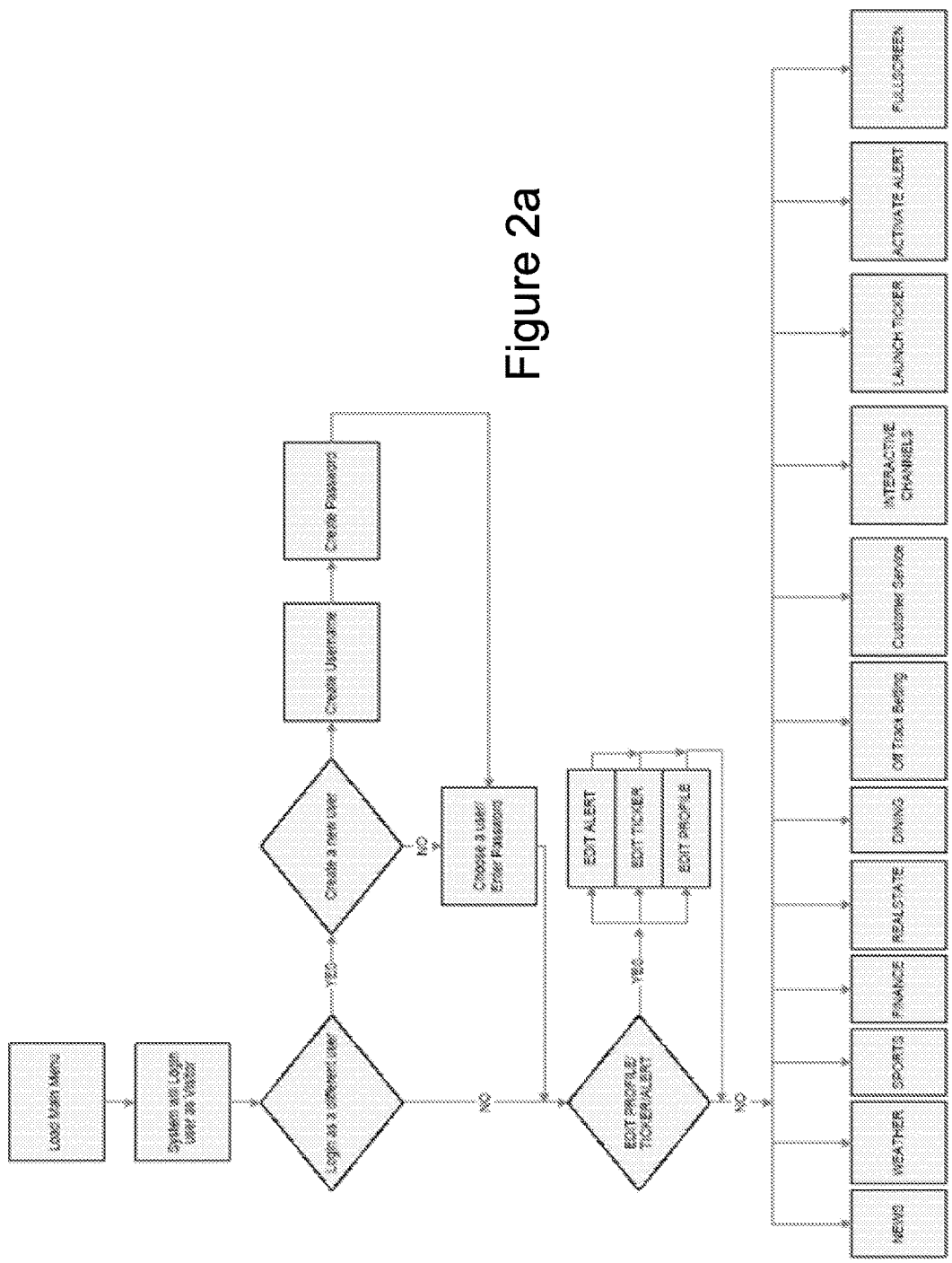
FIG. 2a provides a navigation schematic according to an example embodiment of the present invention.
Figure 2B:
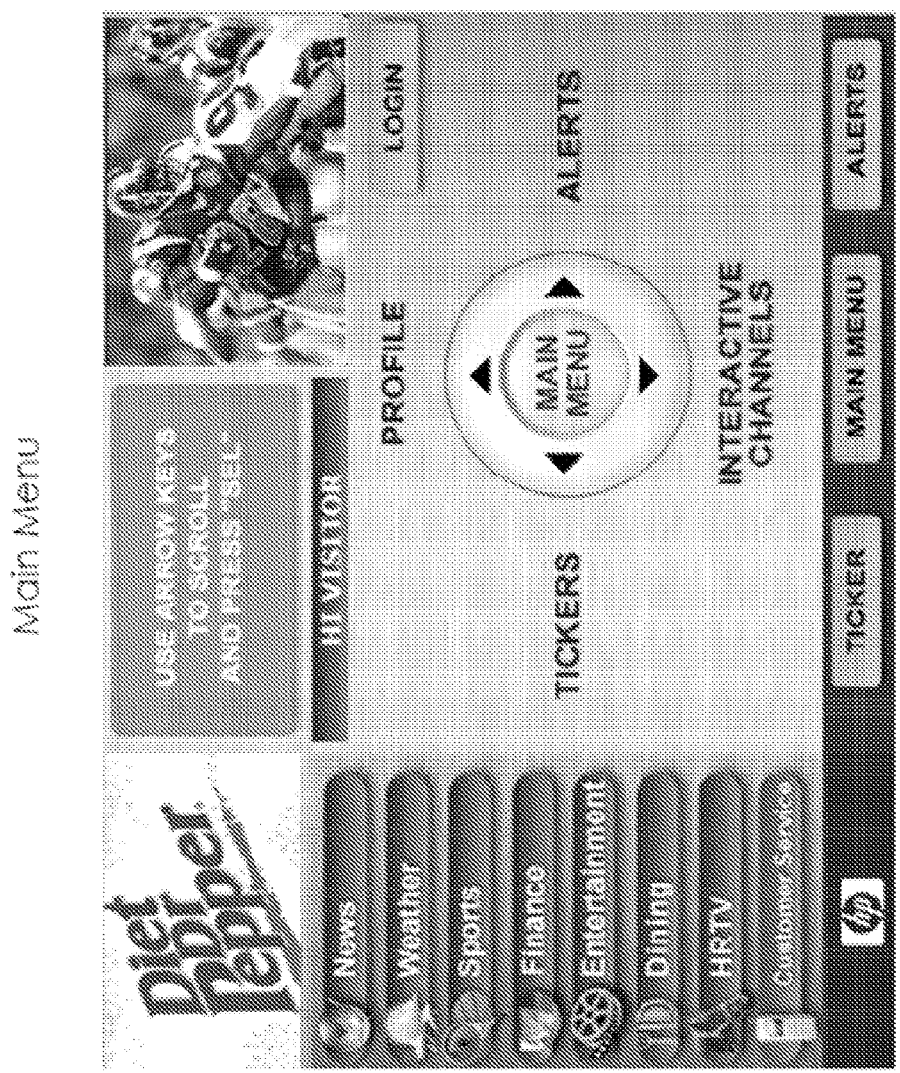
FIGS. 2b-h illustrate example interfaces for receiving user information according to an example embodiment of the present invention.
Figure 2C:
Figure 2D:
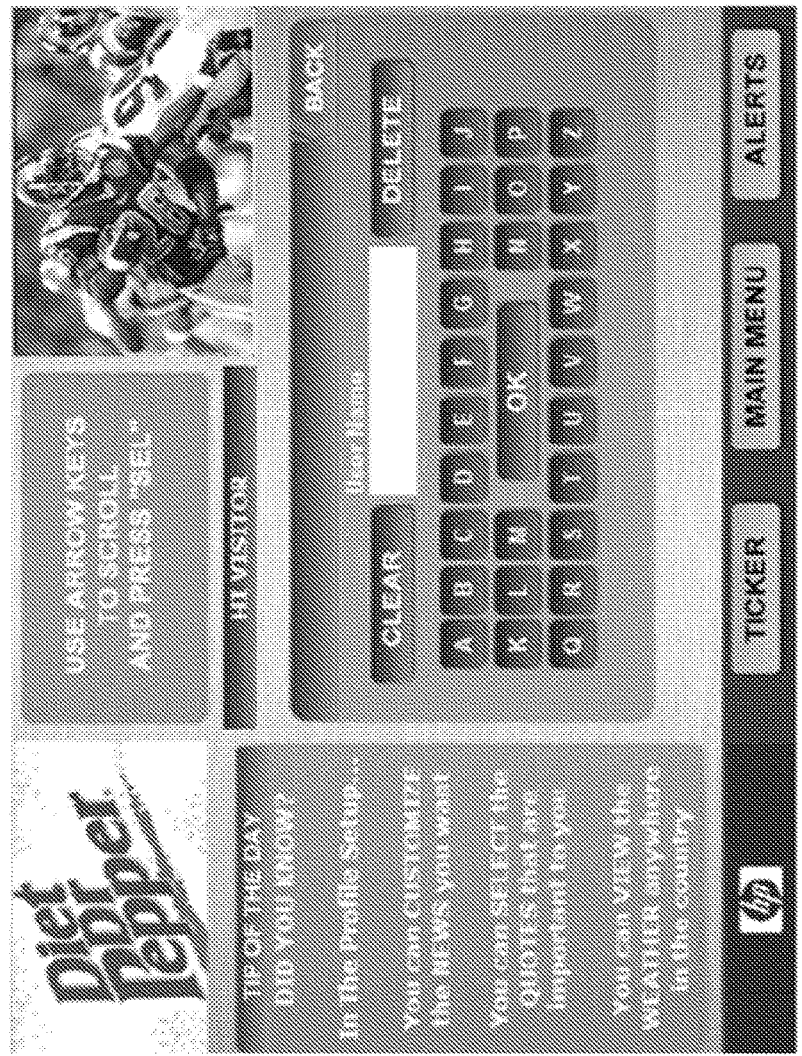
Figure 2E:
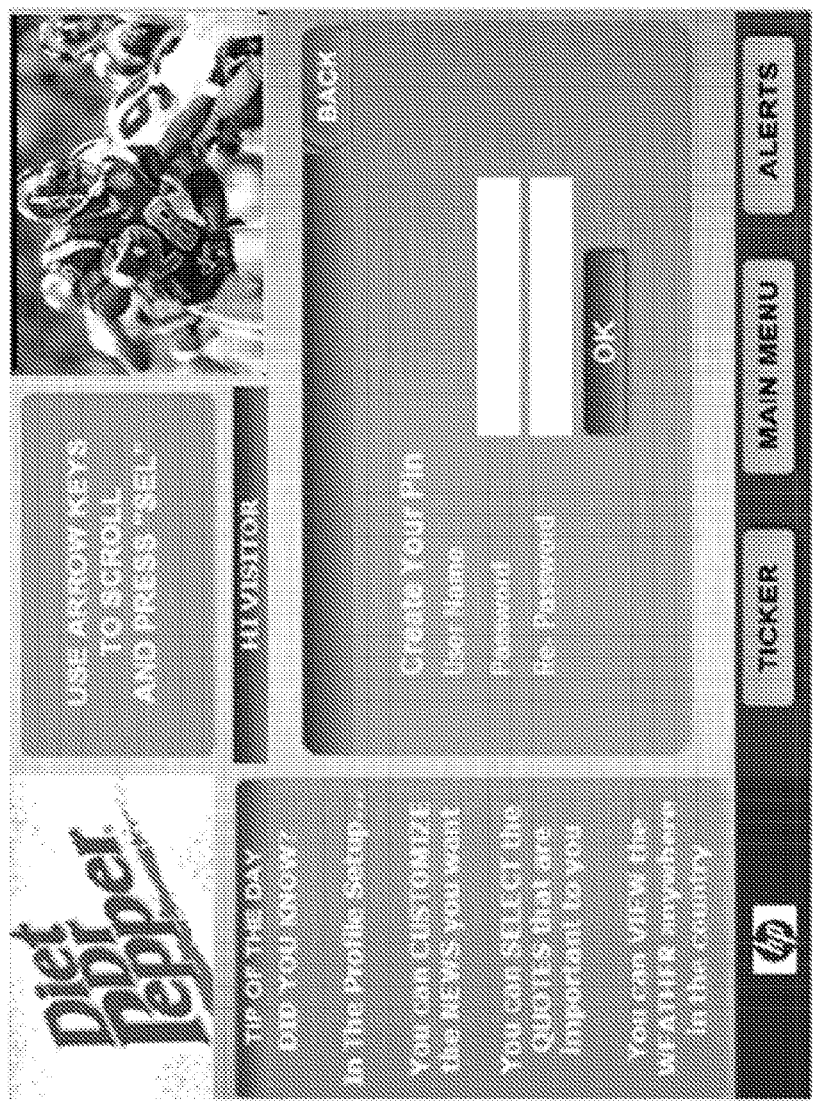

Referring to FIGS. 2a and 2b, the user may select any of a plurality of content via the main menu as well as provide or view user profile information, alert information, and ticker information. FIG. 2a illustrates an example of how the user may navigate through the screens. Specifically, FIG. 2c shows a screen that allows the user to add a new user, delete a user, or login by providing information to the server indicating which user (in that household) is using the set top box 20. Specifically, using the remote control, the user can hi-light and click on any listed user, log in as a visitor, select New User, or Delete a User. FIG. 2d illustrates a screen for allowing a person to create a new user. It is worth noting that one person may create numerous system user accounts, with each typically having at least some different information. FIG. 2e allows the new user to create a pin (or password). The data from the screens shown in FIGS. 2d and 2e is transmitted from the set top box 20 to the server 10 to be stored in the user database in memory (in association with the set top box ID). Thus, the user database of the server 10 may include multiple user accounts associated with a single set top box. It is worth noting that the television programming continues to be presented to the user (displayed in the upper right corner along with audio) to allow the user to continue to watch and hear the audio-video content while the user views interactive content, supplies information, and makes requests. Upon creation of a new user account, the server 10 (or set top box) may assign a user ID (e.g., an identifying user number), which is included in transmissions from the set top box 20 for that user account so that the server 20 can determine which of a plurality of user accounts is requesting or supplying data.

Figure 2F:
Figure 2G:
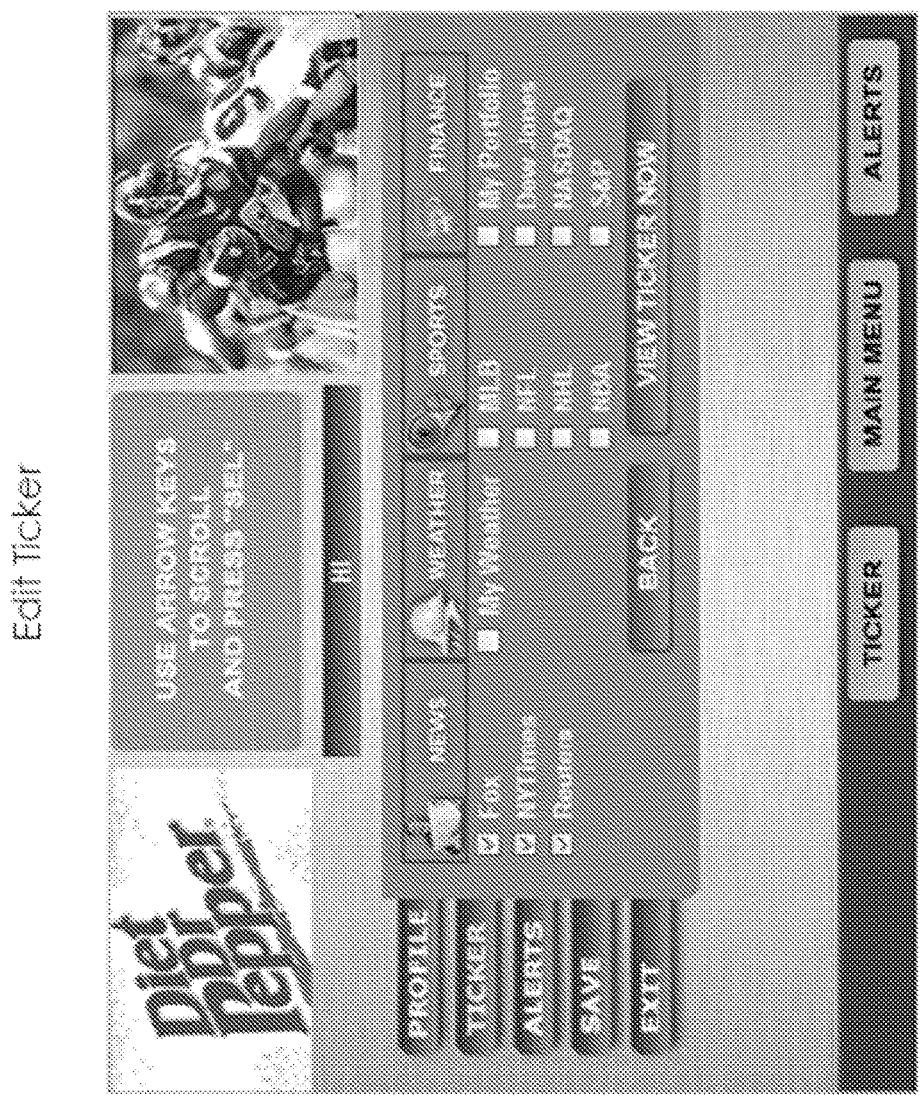
Figure 2H:
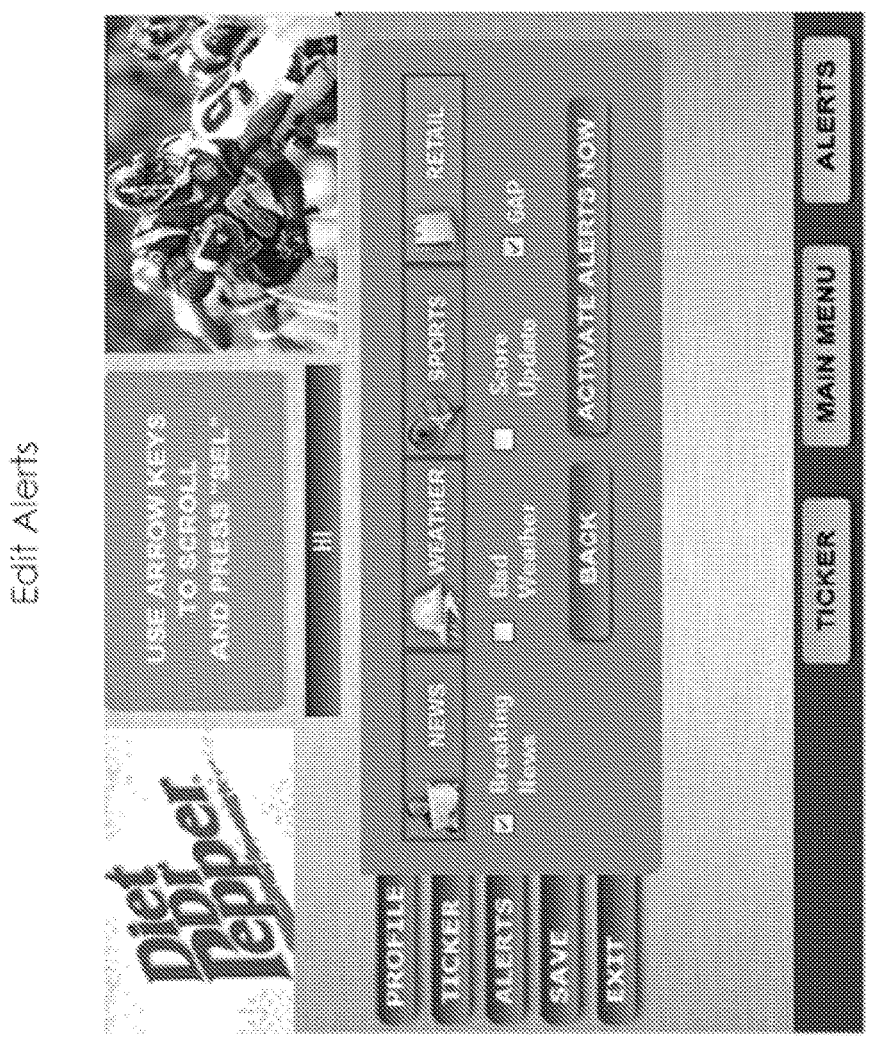

FIGS. 2f, 2g, and 2h allow the user to supply information for his or her user profile, ticker information, and alert information, respectively. Specifically, FIG. 2f provides an example interface that allows the user to provide user profile information by allowing the user to select one or more categories of news from a plurality of new sources. While FIG. 2f only shows a list of news sources and topics from which the user may select, other user profile information may include user selectable weather information, sports information, and finance information as well as subcategories of each type of content category. For example, the user may select sports as a category and football as a subcategory. In other embodiments, the user profile information may additionally include a list of favorite television channels, television programs, and/or other content or data selections. The user profile data may be transmitted by the set top box 20 to the server 10 for storage in the user database (associated in memory with the user account) and may be used to select content and advertising for transmission to the user's set top box and/or account.

In addition, the user may also supply additional information about the user such as the user's age, sex, location information (e.g., zipcode, address, county, state, area code, telephone number, etc.), income information, special interests (e.g., hobbies), birth date, year of birth, employment information (e.g., field of employment, position, title, etc.), ethnicity, marital status, parental status (i.e., how many children), and other data—collectively referred to herein as user data. The user data may be transmitted by the set top box 20 to the server 10 for storage in the user database (associated in memory with the user account) and may be used to select content and advertising for transmission to the user's set top box.

FIG. 2g provides an interface to allow the user to supply ticker information. In this example embodiment, the user may select one or more subcategories (e.g., Dow Jones, NASDAQ, etc.) of content from any of a plurality of categories (e.g., Finance) as well as one or more news sources (e.g., from which to receive news content) and one or more advertisers (not shown).

FIG. 2h provides an interface to allow the user to supply alert information. In this example embodiment, the user may select one or more categories of alerts as well as one or more advertisers (e.g., the Gap®). In other embodiments, the user may select one or more categories of content such as, for example, finance, sports, world, and/or national news as the categories of content about which the user wishes to receive breaking news content (alerts). In addition, the user may select one or more news sources from which to receive breaking news content.

The ticker data and the alert data is transmitted from the set top box to the server 10 (along with the set top box ID and/or user ID) for storage in the user database (associated in memory with the user account).

Figure 2I:
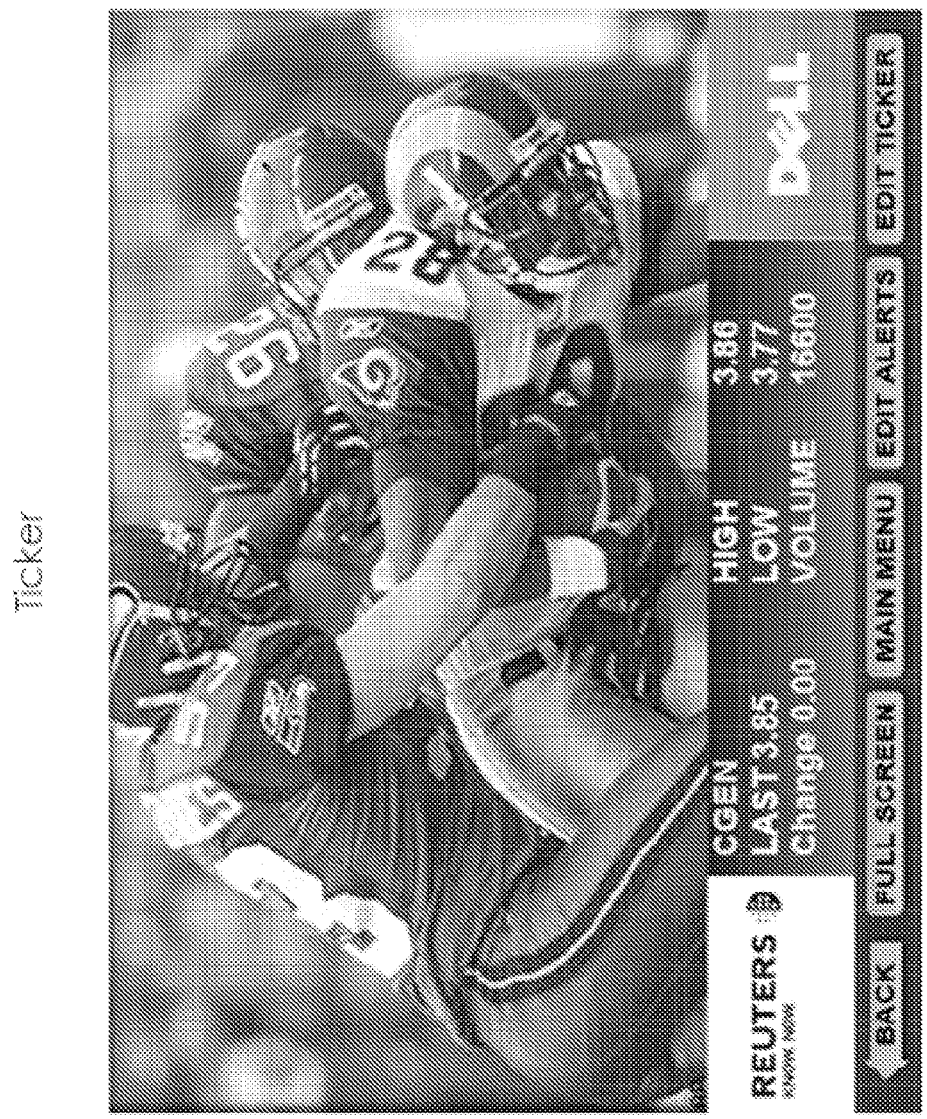
FIG. 2i illustrates an example ticker according to an example embodiment of the present invention.

The user may select and display ticker content or alert content while he or she is watching television programming. FIG. 2i shows an example ticker that is inserted under the television programming. The television programming may be "resized" to allow the ticker to be displayed, along with the full broadcast signal (television program). In other embodiments the ticker may overlay a portion of the television programming. In this example, the user is watching a football game (the television programming) and the set top box 20 is displaying a ticker at the bottom of the television screen. The ticker of this example provides content related to a particular stock, although content associated with any of the categories or sources in FIG. 2g or other information could be shown. The ticker may display a plurality of specific pieces of content (hereinafter content elements) over time. Specifically, each content element has different information and will typically be displayed for a predetermined time period (e.g., five seconds) at which time the HTML client resident on the set top box 20 will display a new content element. Thus, the set top box 20 will receive a plurality of ticker content elements (identified in a ticker list) from the server 20 for display via the ticker. The ticker list and plurality of ticker content elements are stored in the memory of the set top box 20. The HTML client resident on the set top box 20 will rotate through the plurality of content elements displaying each ticker content element for a time, followed by the next, until all are displayed at which time the ticker contents elements are displayed again from the beginning of the ticker list.

When the user turns on the set top box 20 (or sometime thereafter), he or she may activate the ticker feature causing the ticker to be displayed (as shown in FIG. 2i) and causing the set top box 20 to periodically transmit requests for new ticker data. The server 10 may respond by transmitting new data, if new content is available. Thus, the ticker content (and ticker list) may be updated by the receipt of new content elements transmitted from the server 10. For example, even though the user does not take action to request new data, the set top box 20 will continue to transmit (periodically, aperiodically, or intermittently) an indication that the ticker feature is activated, and the server 10 will receive the indication and access the user database to identify, and transmit ticker content elements for that user (e.g., transmit the specific stock content selected by the user on the ticker input interface as shown, for example, in FIG. 2g) if new ticker content is available. As new content is received, the oldest content may be removed from the ticker list and no longer displayed via the ticker. When the user turns off the ticker function, the set top box 20 stops transmitting requests for ticker data and stops displaying the ticker content.

Figure 2J:
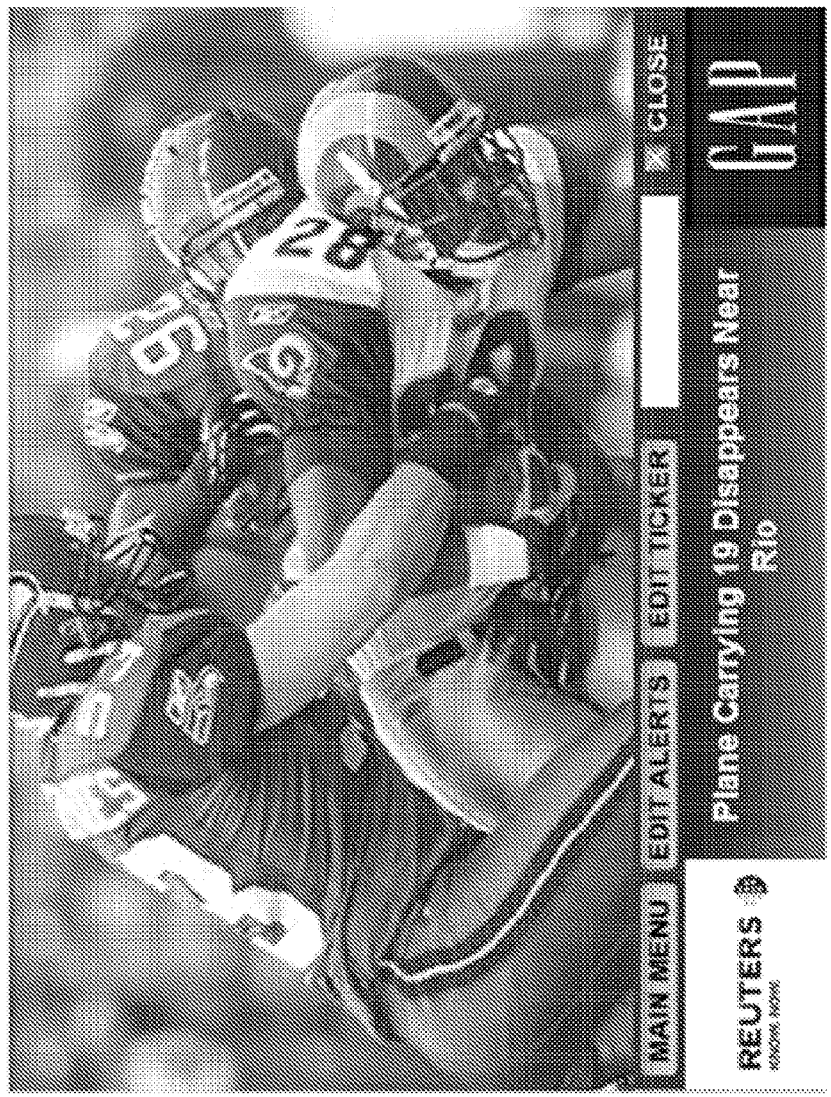
FIG. 2j illustrates an example alert according to an example embodiment of the present invention.

Instead of activating the ticker feature, the user may elect to display alert content while he or she is watching a television program by activating the alert feature. FIG. 2j shows an example alert that is inserted under the television programming. The television programming may be "resized" to allow the alert to be displayed, along with the full broadcast signal (television program). In other embodiments the alert may overlay a portion of the television programming. In this example, the user is watching a football game (the television programming) and the set top box 20 is displaying an alert at the bottom of the television screen. The alert content is displayed for a relatively short period of time when new content is received. The alert content information may supplied to the server 10 by another server 15, 17 and transmitted to all the set top boxes for which the type of alert has been previously selected by the user. The alert, of this example, provides information of a particular news alert although information associated with any of the topics or sources in FIG. 2h or other information could be shown. In other embodiments, the television programming may be made smaller (compressed vertically) and the alerts and/or tickers placed at the bottom so that the entire television programming content is visible. In still another embodiment, the tickers and/or alerts may comprise semi-transparent overlays.

When the user turns on the set top box 20, he or she may activate alerts, which causes the set top box to periodically transmit requests for new alert data. The server 10 may respond by transmitting new alert data, when new alert content is available. While the alert is activated (and until de-activated; i.e., turned off), newly received alert content is displayed on the television display for a predetermined time period after receipt and then removed by the set top box 20. The newly received alert content is displayed while the user is watching television programming so as to allow the user to continue watching the television programming. Thus, even though the user does not take action to request new alert data, the set top box 20 will continue to transmit an indication that the alert feature is activated, and the server 10 will receive the indication and access the user database to identify new alert content (i.e., the content sources, categories, sub-categories and specific content to be provided for the particular user) and transmit the new alert content elements for that user (e.g., transmit the content of the specific content categories selected by the user on the alert input interface) if new alert content is available.

While there may be many set top boxes 20, only a subset of the total number of set top boxes will be turned on and have the alert or ticker function activated. Thus, in one example embodiment, each of the activated set top boxes periodically (e.g., every ten seconds, one minute, three minutes, five minutes, fifteen minutes, thirty minutes, or sixty minutes) transmits a request for alert content or ticker content. In one implementation, the request may be a generic request that includes data sufficient to identify the (1) the user account; (2) the set top box (e.g., in the instance where there is only one user profile associated with the set top box); or (3) the set top box and user (e.g., where there is more than one user profile associated with the set top box). The request also may include information to indicate what content is needed (ticker content or alert content). The ticker data and alert data previously supplied by the users and stored in the user database accessible by the server 10 indicates the variety of content to be provided to the set top boxes 20. Specifically, stored in memory in the database, and associated with each user account (or, alternatively, with each set top box where there is only one user per set top box), is information of the ticker and alert content selected by that user. The server 10 receives the requests from the set top boxes 20, and information (e.g., user ID or set top ID) that allows the server 10 to access the database to retrieve information to determine what content to be provided to the activated set top boxes. Thus, upon receiving of a request for content, the server 10 accesses the user database to retrieve information of the specific content to be provided to the activated set top boxes (or user thereof) from whom the request is received. In another embodiment, the requests for ticker and alert content is logged (stored in memory) and the server periodically (e.g., every five, ten, fifteen, or thirty minutes) identifies, collects, and transmits the new content to the requesting set top boxes 20.

In this example embodiment, there are two methods of obtaining the content for the plurality set top boxes 20. A first method—referred to herein as "pulling the data"— includes transmitting a request for the data. As an example, the user database of the server 10 may include the stock symbols selected by all the users having activated alerts and/or tickers. While this may be a large number of symbols, it may still be a much smaller number than the total number of stock symbols of the financial markets. Consequently, instead of transmitting a request for all stock symbols (or receiving all the symbols periodically) the server 10 may transmit request(s) for only those stock symbols in its user database for those set top boxes that are activated for alerts and/or tickers. Similarly, the server 10 may pull the data (transmit a request for, and receive the data) for other types of content such as weather (by requesting weather for geographical areas of activated set top boxes), news, and other content.

While the server 10 will periodically (and continuously) receive requests for ticker data and alert data, depending on the embodiment the server 10 may transmit requests for new content less frequently than the server 10 receives requests from set top boxes 20. Thus, in some respects, the request from the set top boxes 20 that have the ticker feature or alert feature activated may be considered a ticker ping or alert ping (that includes user account and/or set top box identifying data) that informs the server that the set top box 20 is awaiting new content when it is available. In addition, if no new content is available after receiving a request (either because it is too early to request new content or no new content has occurred yet (e.g., no new breaking news stories), the server 10 may not respond with any message or may respond with a notification that there is no new content available.

Another method of obtaining content includes receiving pushed data. Specifically, when the amount of content from a provider typically is not too large, the content provider (e.g., server 15 or 17) may periodically push the content to the server 10 (i.e., transmit the new content to the server 10 without the server 10 transmitting a new request for the content). As example, all sports content may be pushed to the server 10 and stored on the server according to the type and/or category of sports content (e.g., football, baseball, etc.). The server 10 retrieves and transmits the specific categories of sports content to each activated set top box 20 according to the categories of content stored in the user database (as selected by the user). For example, only those users who have selected football content will receive football ticker or alert content. The content transmitted to the set top boxes 20 may be transmitted via broadcast, multi-cast, or unicast methodologies depending on the embodiment.

Figure 2K:
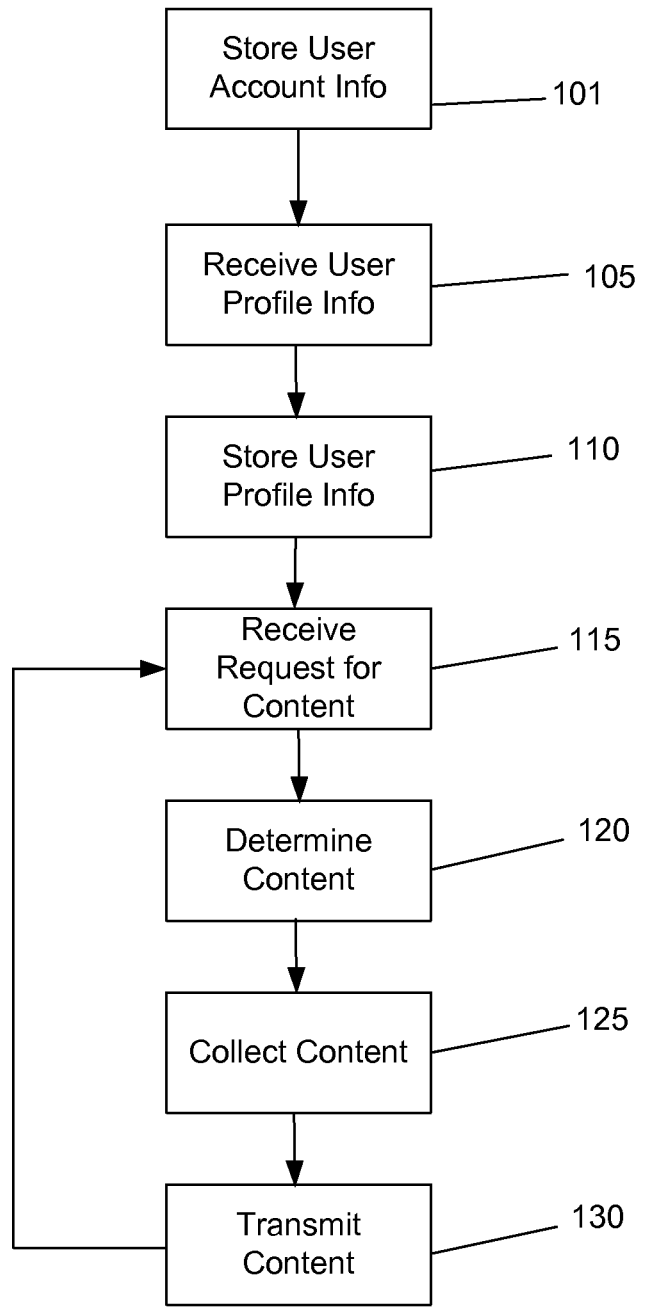
FIG. 2k illustrates processes of an example implementation for providing content according to an example embodiment of the present invention.

FIG. 2k illustrates the processes of an example implementation for providing content to a plurality of set top boxes. The user account information received from one or more set top boxes is stored in memory at the server 10 at process 101. This information may include, for example, a user name and password. The user account information, in some embodiments, may be stored in the memory in association with a set top box 20 (meaning the user account data is stored so that the server 10 can determine the set top box that the user account). In some embodiments, the user account may be associated with multiple set top boxes (e.g., where one household has multiple set top boxes). In other embodiments, the user account is associated with a customer (e.g., a customer number, address, phone number, or other identifying information). At process 105, the server 10 receives user profile information, which in one embodiment may include information identifying content sources (e.g., new sources), categories of content (e.g., sports), sub-categories of content (e.g., football), and/or other such content information. The user profile information is stored in the memory in association with the user account at step 110. At process 115, the server 110 receives a request for content for example, via one of the interfaces of FIGS. 3a-f. The request may identify the user account, the set top box, the interface (screen) from which the user is making the request, and/or other data. At process 120, the server 10 may then determine the content to be transmitted to the set top box 20 by accessing the user database and retrieving (from memory) the content in accordance with the content selections supplied by the user via the user profile interface. At process 125, the needed content is collected, which may include retrieving content from memory (which may be pushed content), and/or transmitting a request for and receiving the content (i.e., pulling the content). The content is then transmitted to the set top box for presentation to the user at process 130.

FIGS. 2b-2j and other figures herein illustrate that the screens may include advertisements (e.g., Dell®, Gap®, and Diet Dr. Pepper® shown in the figures). Such advertisements may be selected by the server 10 (from a database of advertisements) based on user profile information, location information (e.g., zipcode), user information, programming selected by the user, and/or other information. New advertisements may be received and displayed by the set top box 20 periodically and/or intermittently as part of a ticker, alert, or other interactive interface. The user may click on an advertisement to get more information about the product (which may be displayed on a subsequent screen or sent via email or postal mail) and/or to purchase an advertised product (e.g., via a subsequent screen). Specifically, when the user selects an advertisement (via the remote control or other input), the set top box transmits a request for the next screen, which may be informative (and provide more information), allow purchase of an item, cause additional information to be transmitted to the user via another method (e.g., email, postal mail, text message, etc.), and/or facilitate other interactivity.

As discussed, the present combines interactive content with television programming to allow the user to receive content with which the user can interact. In addition, by making the interactive content complementary to the television programming, the combination may be more appealing to viewers thereby increasing the number of users who watch the televisions program. In addition, some embodiments of the present invention facility providing an incentive to users to view television commercials and provide advertisers with an indication of the number of users (and which users) watched their commercials (even if some commercials and programs were digital recorded and watched at a later time).

Figure 3A:
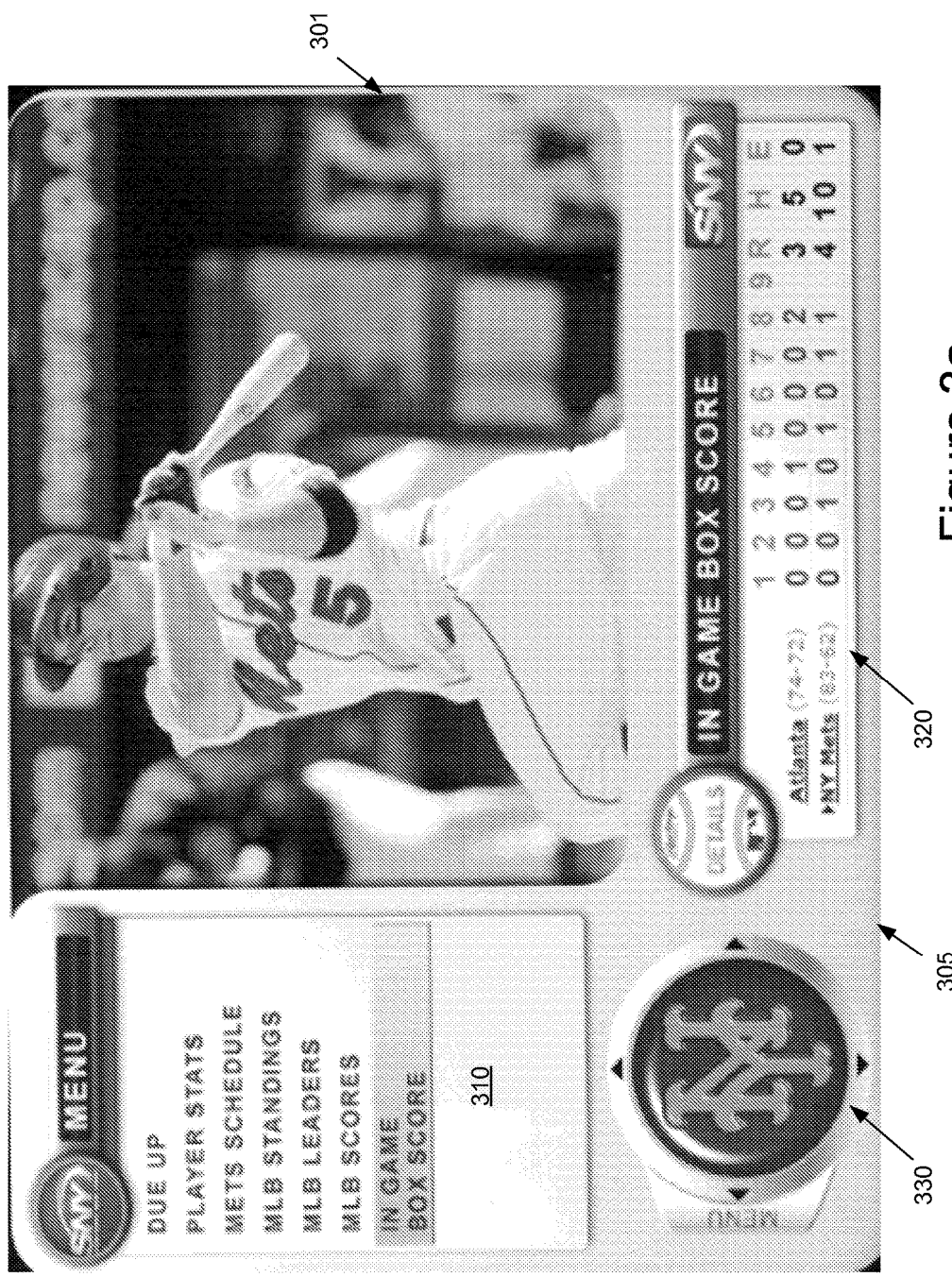
FIGS. 3a-4c illustrate examples of interactive content and programming content according to an example embodiment of the present invention.

FIG. 3a illustrates an example of a display that includes television programming content displayed in a television programming content box 301 (i.e., showing the baseball player) and interactive content 305 that contains the box score 320, a menu 310, and a navigation button 330. In this embodiment, the interactive content 305 is displayed in an L-shaped area that abuts the programming content box 301 on two sides. In other embodiment, the interactive content 301 may be displayed along the bottom, top, or either side of the television display (e.g., in a banner format instead of an L-shaped format). The menu 310 allows the end user to select other interactive content for display. More specifically, the user can scroll through a list of content in the menu and select one for display. As illustrated, the user has selected "In Game Box Score", which has caused the "In Game Box Score" 320 content to be displayed along the bottom of the display. From the menu 310, the user can also select and view content that displays the next one or more players expected to bat after the existing batter, player statistics, the teams schedule, baseball standings, baseball player leaders (e.g., in a statistical category such as homeruns, steals, earned run average (ERA), batting average, etc.), or scores of other games. In one embodiment, all or most of the interactive content data (e.g., the next batters up, baseball standings, etc.) may be requested, received and stored in memory of the set top box when the viewer opens the interactive content 305. In this embodiment, the interactive data is requested by the set top box 20 when the user actuates a menu item or other button. The request for interactive data (e.g., standings) may be sent to the server 10, which may then routes the request to the appropriate sports content server (e.g., one of server 15a, 15b, 17a, or 17b). The response from the content server is then routed to requesting set top box 20 by the head end server 10.

The navigation button 330 is used to control the scroll bar 332 of the menu 310. A details button 333 (resembling a baseball) allows the user to view more detailed box score information.

Figure 3B:
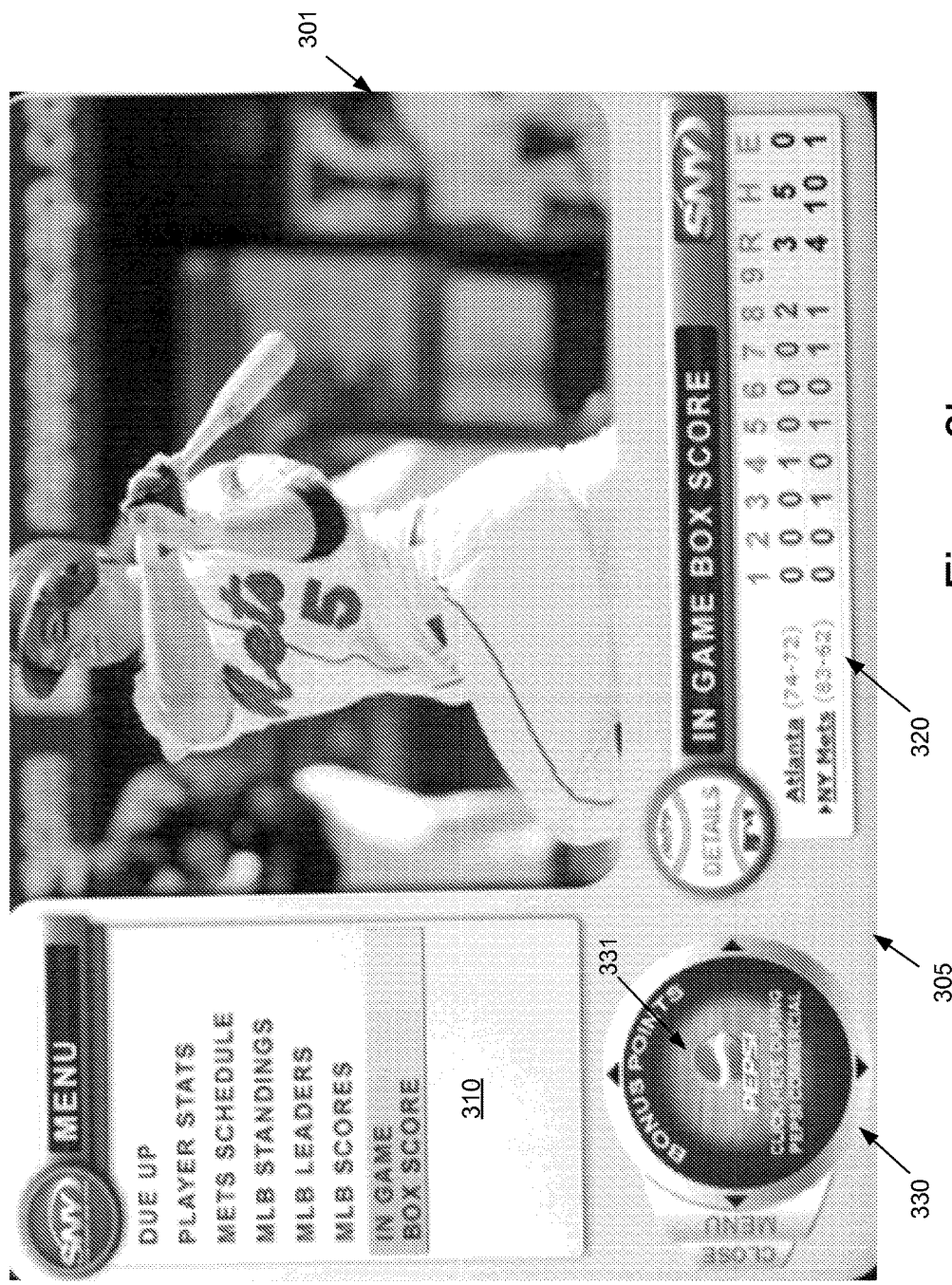

FIG. 3b illustrates an example of another display that includes a television programming content box 301 (i.e., showing the baseball player) and interactive content 305 that contains the box score 320, a menu 310, and a navigation button 330. In this example, the navigation button 330 also functions as an incentive button 331 in its center that includes text that reads "BONUS POINTS" and "CLICK HERE DURING PEPSI COMMERCIAL" along with the PEPSI® and product logo. Thus, this example of interactive content 305 provides a message conveying an incentive to the viewer to watch a specific commercial and to actuate (click) on the incentive button 331 during the Pepsi commercial. The incentive is that the viewer gets the bonus points by selecting the button 331 when the identified commercial (e.g., Pepsi) is presented in the television programming box 301.

When a viewer selects (actuates) the button 33', the software resident on the set top box determines if the appropriate commercial (a Pepsi commercial in this example) is being presented in the programming content box 301. If the appropriate commercial is being presented in the programming content box 301, the software causes the set top box 20 to transmit an indication to the head end server 10 indicating that the viewer performed the requested action to thereby increase the number of points by a quantity equal to the bonus points offered by the incentive. In addition, or alternately, if the tally of points is maintained by the set top box 20, the software simply increases the viewer's quantity of points by the number of bonus points awarded for actuating the button 331 during the commercial.

The bonus points may comprise any suitable incentive to the viewer to motivate the viewer to provide an indication that he or she has watched a commercial or to take another action. In some examples, the bonus points may comprise points scored by the viewer in an interactive game such as in a game wherein the user is competing against other viewers. In other embodiments, the bonus points may be, may equate to, or may translate to (e.g., 100 bonus points equals one point of . . . ) frequent flier miles, discount points, money (e.g., cents), purchase points (e.g., points that accumulate to be redeemed for various products), loyalty points, gift cards, etc. Incentive points also may be used for (translate to) a discount on the viewer's television service provider bill (e.g., cable television bill, digital broadcast television bill), telephone bill, utility bill, Internet access bill, credit card bill, and/or one or more discounts on a product of a vender (e.g., such as an online store).

Figure 4A:
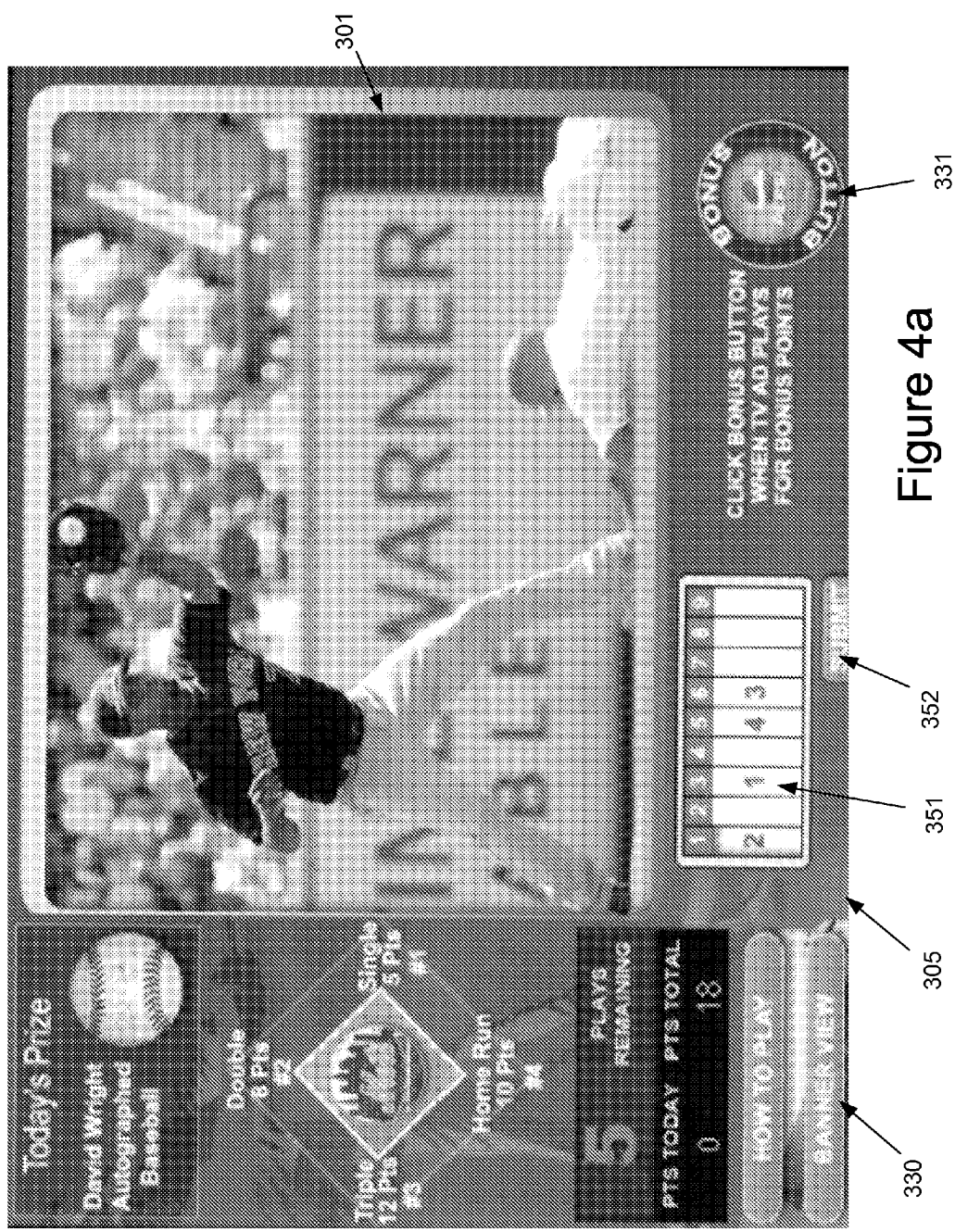

FIG. 4a illustrates another example display for implementing the present invention that includes the television programming content box 301 (i.e., showing the baseball player) and interactive content 305 in an "L" shaped configuration. The interactive content 305 of this example allows the viewer to play an interactive game based on the television programming content, which in this example is a baseball game. In this game, the viewer attempts to guess the outcome of a player's turn at batt (e.g., each and every baseball player or baseball players selected by the viewer). The viewer can guess that the batter will hit a single, double, triple, or homerun and be awarded five, eight, twelve, or ten points, respectively, if the viewer is correct. In this example, each viewer can guess the outcome only a finite number of times (e.g., twenty times) while in other embodiments, the viewer can guess for each batter on one or both teams. As illustrated, the system keeps track of the number of times the viewer guesses and displays the remaining number of plays (five in this example) as part of the interactive content 305. The winner of the game (e.g., the first viewer to reach a predetermined score during the baseball game, over multiple games (e.g., three games or the entire season), or the viewer with the highest score at the end of the game) may win a prize (e.g., points), which is displayed by the interactive content 305. In this example, the viewer also may select which innings a particular hit will be accomplished (e.g., single=1, double=2, triple=3, and homerun=4) and the viewer's selections (1, 2, 3, and 4) may be displayed in the selected inning column of selection table 351. When the user actuates the submit button 352, data entered by the user may be stored on the set top box and/or transmitted to the head end server (and/or other server 15, 17) for storage and scoring. This game (selecting which innings a particular type of hit will occur) is referred to herein as the "Hit-for-a-Cycle Game."

The game can be played by a viewer over a weekend, week, month or until a predetermined point total is reached (e.g., over one or multiple sports events of the same or different type) by the viewer or by any viewer competing with a group of (or all) other viewers. For example, the invention may be used to allow viewers to select teams for one or more brackets in the NCAA tournament (which occurs over multiple weeks). The interactive content 305 displays the viewers score(s) (e.g., total points of 18) and the total points awarded for the day (e.g., zero). In this example, the interactive content 305 also includes an incentive button 331, which the viewer can select during a pre-identified commercial (e.g., Pepsi) to be awarded additional points in the game (or otherwise providing an incentive).

Figure 4B:
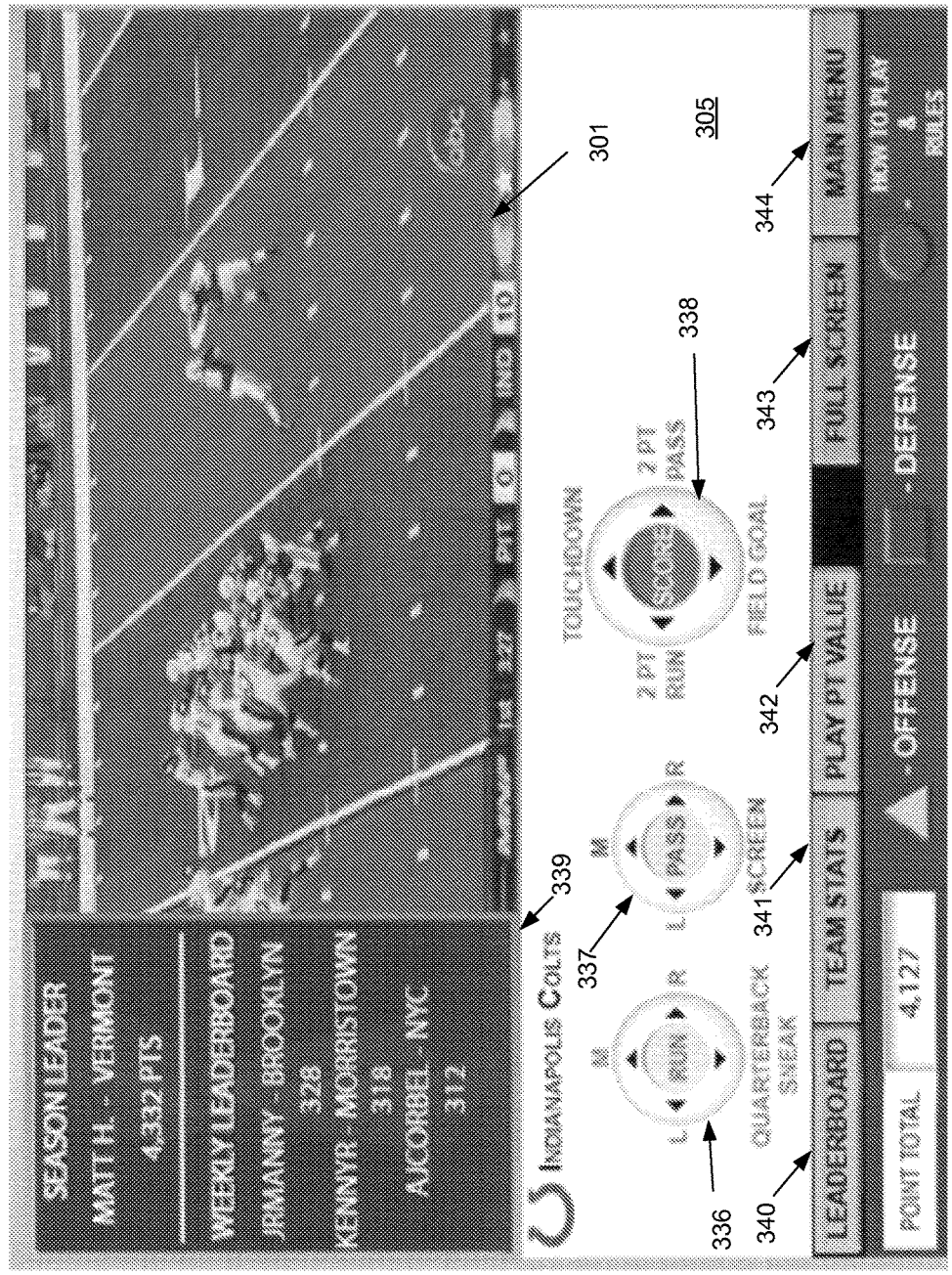

FIG. 4b illustrates another example display for implementing the present invention that includes interactive content 305 in an "L" configuration around the television programming content box 301 (i.e., displaying the football game). The interactive content 305 of this example allows the viewer to play an interactive game based on the television programming content shown in the content box 301, which in this example is a football game. In this game, the viewer attempts to guess the next play executed by the offense (or defense) and/or the result of the next football play. The viewer can elect to guess the next offense or defense play by selecting the respective button at the bottom of the interactive content 305. In the example illustrated, the user has elected to guess the next offensive play and, by using a first button 336, the viewer can guess that the next offensive play is (1) a run to the left; (2) a run up the middle; (3) a run to the right; or (4) a quarterback sneak. Using a second button 337, the viewer can also (or alternately) guess that the next play offensive play is (1) a pass to the left side of the playing field; (2) a pass down the middle of the playing field; (3) a pass to the right side of the playing field; or (4); a screen pass. Using a third button 338, the viewer can also (or alternately) guess that the result of the next play will be a touchdown, field goal, two point conversion run, or two point conversion pass (and in other embodiments, a first down). As will be evident to those skilled in the art, numerous variations of this game and the others described herein may be implemented.

The interactive content also includes a vertical portion 339 that (in the figure) is displaying the season leader (MATT H.—VERMONT) along with the leaders for the week (WEEKLY LEADERBOARD)—which is displayed by default (at initiation of the game) or as a result of the viewer selecting the leader board button 340. Thus, the disclosed interactive game allows viewers to compete over a single sporting event or multiple sporting events (as in this example).

Figure 4C:
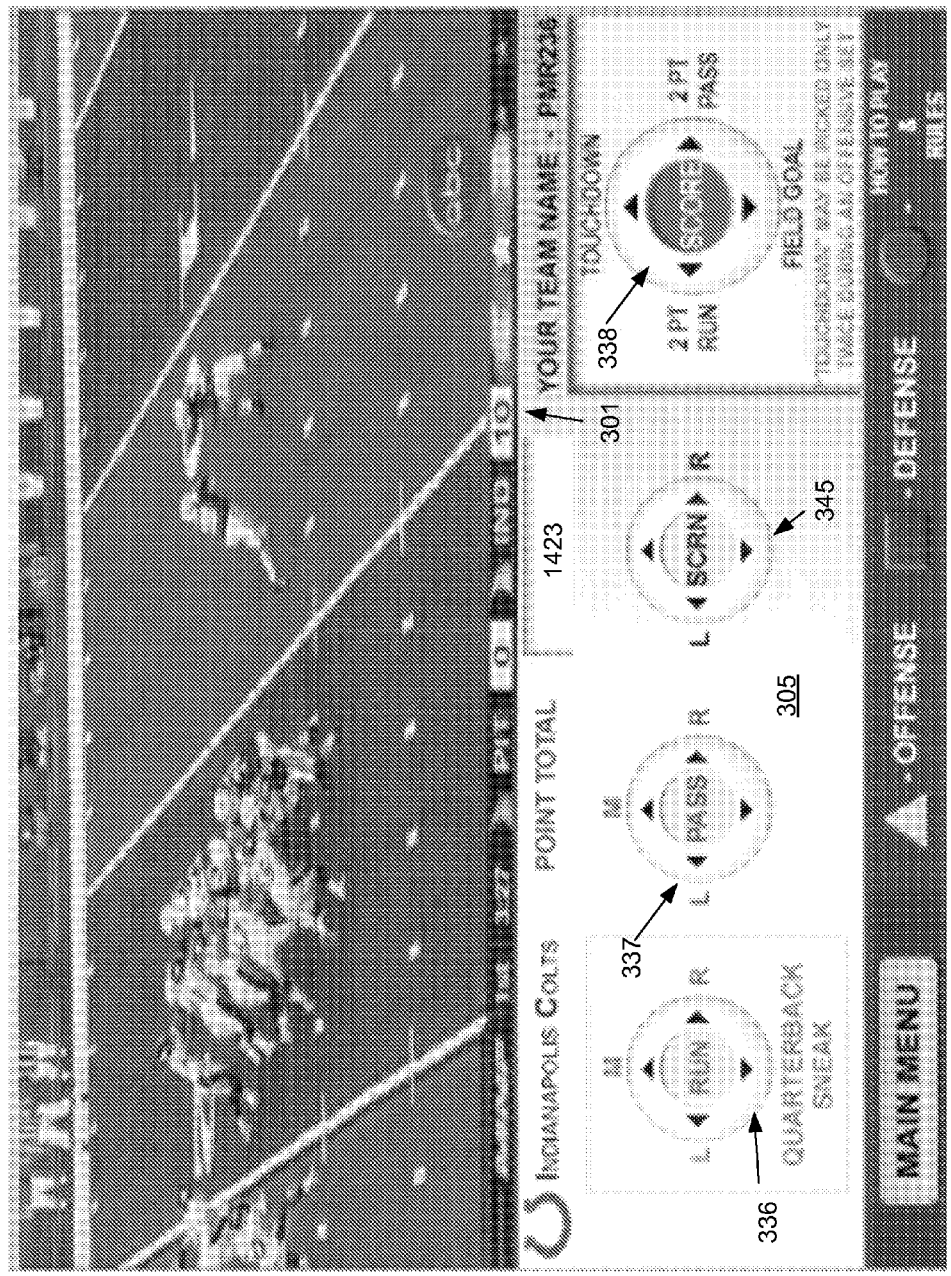

Referring to FIG. 4b, the viewer also may select the team statistics button 341 to view either (or both) teams statistics in the vertical portion 339 or the full screen button 343 to remove the interactive content 305 and display the television programming content on the entire television display. By selecting the main menu button 344, the viewer can view additional menu items in the vertical portion 339. Among other things, the main menu allows the viewer to change the display format of the interactive content 305 from L-shaped (as shown in FIG. 4b) to banner format (as shown in FIG. 4c). The interactive content 305 of FIG. 4c also includes a button to allow the viewer to select a screen pass to the left or right side of the playing field. In various embodiments, the interactive content is displayed concurrently with a football game and also may include an message conveying an incentive to take an action during the presentation of any, all, or a specific (identified) commercial.

The games that may form a basis for interactive content described herein may allow each viewer to compete against all other viewers participating in the game, against a predefined (or random) group of players (e.g., the viewers family, friends, co-workers, school students, fraternity members, sorority members, neighborhood, people of the same age, sex, or other demographics, etc.). In addition, in some embodiments various viewers competing against each other may be viewing different program content (e.g., a different football game) in the content program box 301.

In one embodiment, the interactive content area may be used to display data for, and to facilitate, a fantasy sporting event such as a fantasy baseball game, fantasy football game, fantasy golf game, or other fantasy game. In such an embodiment, the viewer enters his or her fantasy players and the system displays the points scored by each player and the total points. The viewer may enter the data (his or her fantasy players) via the internet through conventional means (e.g., using a computer to access a server to pick the players) and then watch the progression of the game and score via the interactive content 305. Similarly, if applicable, the viewer's opponent enters his or her players. Consequently, the system also can display each score of each fantasy player of the viewer's opponent and the total score of each viewer. It is worth noting that typically, only some of the players (but not all) of the viewer's fantasy team will be playing in the football game that the viewer is viewing in the content box 301.

Figure 5:
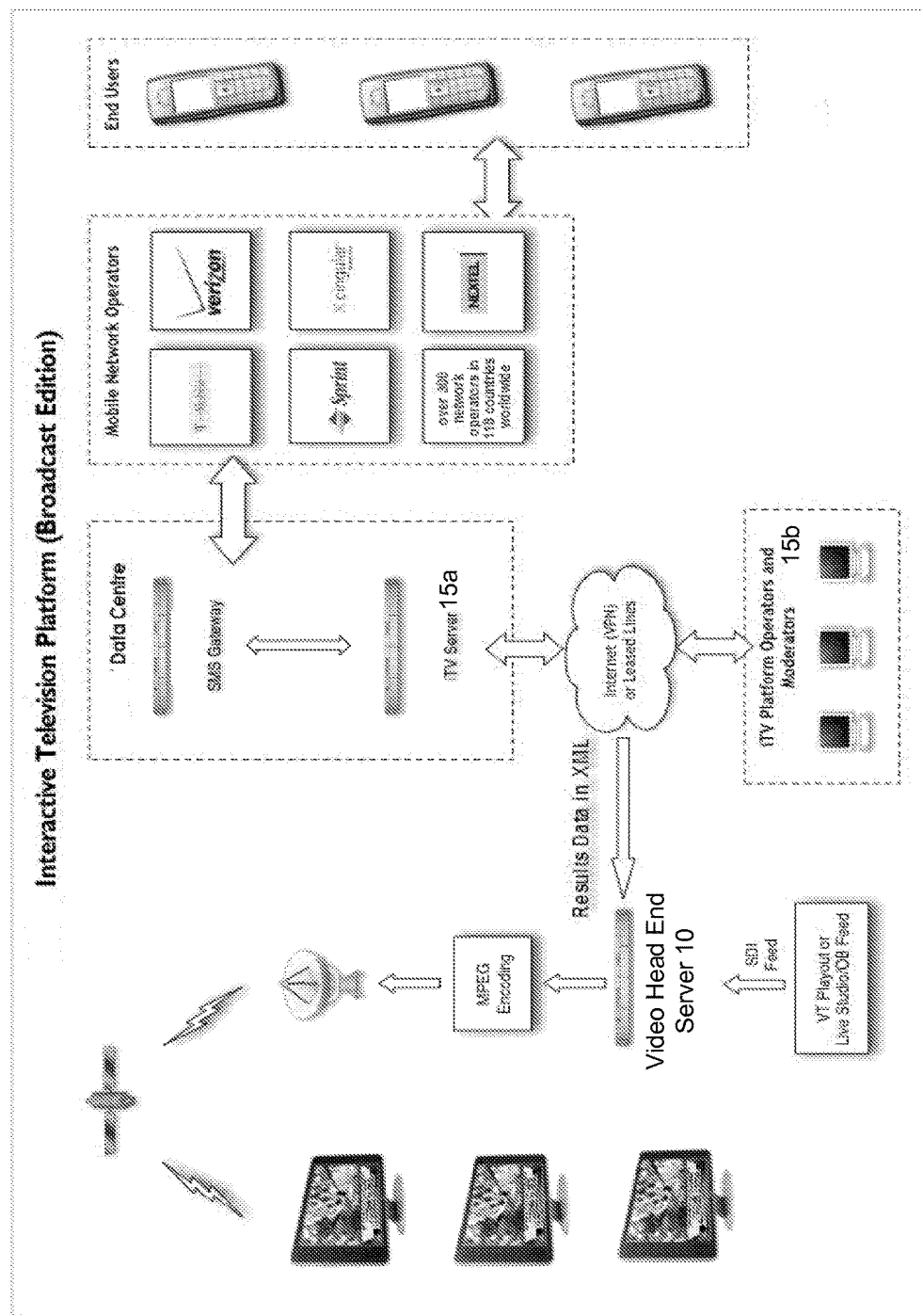
FIG. 5 illustrates a network implementing another example embodiment of the present invention for use with mobile telephones.

FIG. 5 illustrates an example platform for allowing mobile telephone users to play a game presented via the interactive content. More specifically, the viewers of the television programming content and interactive content may supply their answers (their selection data) via their mobile telephone such as by using short message service (SMS or sometimes referred to as texting) to provide their selections to an interactive server 15a or other predetermined destination. The interactive operations servers 15b may provide interactive content to the video head end server 10 and supply event data to the interactive server 15a for scoring. Other servers 17 may also be used although they are not shown in this figure. The selection data from the end users traverses a mobile network to a data center, through a SMS gateway to the interactive server 15a. In this embodiment, the users may be associated in memory of the server 15a with a specific mobile telephone number (instead of customer ID). This platform and associated processes may be used instead of, or in addition to, the platform for allowing the viewers to supply selection data via their remote control. Thus, some embodiments of the present invention allows users to interact using their remote control or their mobile phone. Use of a mobile phone may be advantageous when many people are watching the same television (such as in a restaurant, bar, sporting event (watching a jumbotron), airplane, train, etc.).

Figure 6A:
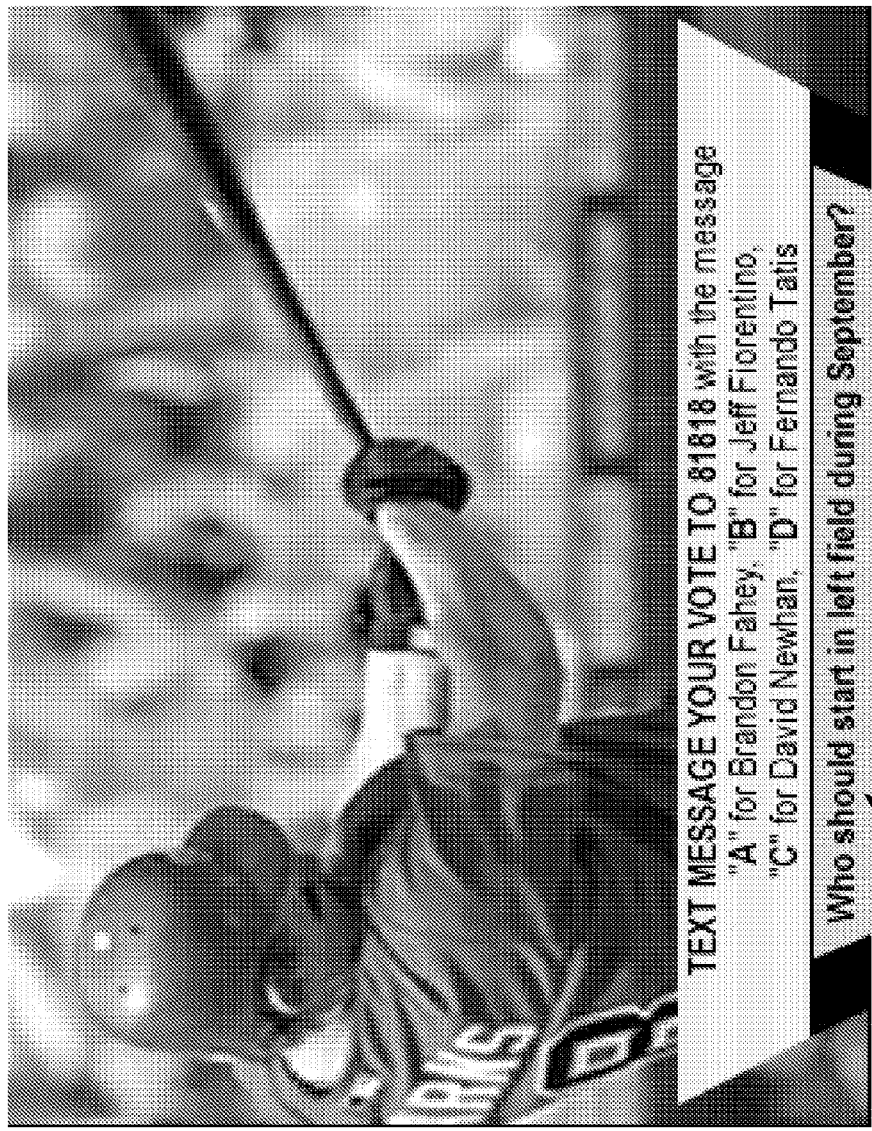
FIGS. 6a-b illustrate examples of interactive content and programming content according to an example embodiment of the present invention.
Figure 6B:
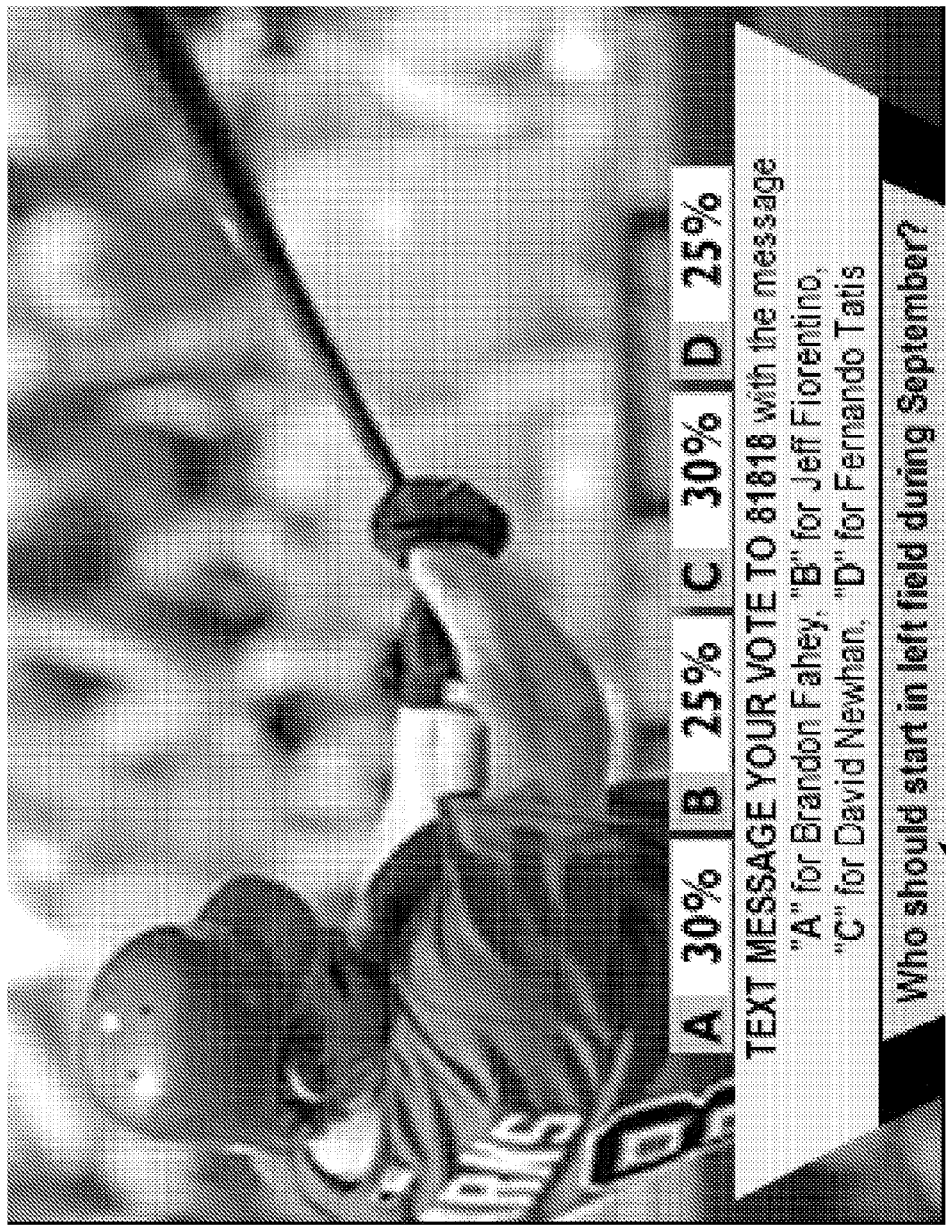

FIG. 6a illustrates an example of interactive content 305 overlaying the television programming content and that conveys a message to cast a vote for a particular player. FIG. 6b illustrates another example of interactive content 305 overlaying the program content and that conveys the original message and the results of the viewer voting.

The system may allow users of mobile telephones to participate in games even though there is no interactive content displayed on the television. For example, in one embodiment the mobile phone users may play the Hit-for-a-Cycle game without the use of interactive content. In this example, the users sign up for the Hit-for-a-Cycle game on the internet or buy sending a text message (SMS message) to a predetermined number. In either instance, the user's phone number (and in some instances, in association with the user's name, address, age, profession, and other demographic information) is stored in memory of the server 15a.

In this example, just prior to the start of a baseball game, the server 15a sends a notification text message to each user that has signed up to play the Hit-for-a-Cycle game. In other examples, each player selects one team (or multiple teams) to play along with and at the beginning of each baseball game, the server 15a sends a notification text message to each user having selected either team playing in that baseball game. Thus, the server 15a may transmit text messages to the mobile telephones of a different group of users for each baseball game that is being played (some baseball games being concurrently played). The users may then reply to the received notification text message with their selections for the Hit-for-a-Cycle game.

Thus, in one example of the of Hit-for-a-Cycle game the notification text message prompts the user to enter and reply (i.e., hit the reply button and then the send button) to the notification text message with a four digit number, wherein each digit corresponds to the user's selection of an inning during which a corresponding type of hit will occur. More specifically, the first, second, third, and fourth digit of the number entered by the user corresponds to the user's selection of an inning for a single, double, triple and homerun, respectively. Thus, if the user enters 4852, the server 15a would interpret the entry as the user's selection of a single in the $4^{th}$ inning, a double in the $8^{th}$ inning, a triple in the $5^{th}$ inning, and a homerun in the $2^{nd}$ inning. The data from the mobile phones of the plurality users is stored in memory of the server 15a in association with each user. More specifically, the server 15a determines the phone number from which the data was sent and stores the four digit number in memory in association with the user associated with that phone number.

As the baseball games progress and each inning passes (or at the end of the game), the server 15a receives event data and scores the selection data (i.e., scores the innings selected for each type of hit as represented by the four digit number) of each user. The correct identification of an inning for each type of hit may be scored differently (i.e., result in a different number of points awarded) given that some types of hits are much more common than others (e.g., singles are much more common than triples). Scoring data may be sent to the mobile phones of each user that scores points (e.g., that correctly selects the inning for an associated type of hit) or all users at the end of each inning and/or at the end of the game. The users may compete for the duration of one baseball game, multiple baseball games (e.g., a series), and/or the entire season.

The notification text message as well as other text messages sent to the users may each include one or more advertisements as well as identify a prize (e.g., a cash prize) to be awarded to the user(s) who get the highest score or that correctly identify the innings in which each of the four types of hits occurs. For the latter, in baseball games in which no user correctly identifies the innings in which each type of hit occurs, the cash prize may escalate for the subsequent game to thereby increase the value of the prize until someone wins.

If a user who is playing the Hit-for-a-Cycle game across multiple baseball games wishes to use the exact same four digit number as was most recently played by that user, the user can simply enter the letter "r" and reply to the notification text message. Upon receipt, the server 15a determines the phone number sending the text message and retrieves the four digit number associated with that user (e.g., phone number) that was most recently used and stores the retrieved four digit number for use in the upcoming baseball game.

While in this embodiment the users may provide their selection data via their mobile telephone, in other embodiments the users may provide their selection data via the internet in response to a notification email that includes an advertisement. In various embodiments, users may play the Hit-for-a-Cycle game (or any other suitable game) via use any one or combination of: interactive content presented with television programming content, mobile telephones, and the Internet. If all three methods are used, some users supply their selection data via their remote control via the interactive content displayed on a television, other users may provide their selection data via text messaging (or other mobile telephone network communications), and other users may provide their selection data by inputting the data into an HTML form on the internet or by replying to an email. A user from any of the groups may compete against users in any of the other groups. In addition, a user may use a first method to provide their selection data for some game(s) and use a different method to provide their selection data for other game(s).

As will be evident to those skilled in the art, the users playing the Hit-for-a-Cycle game via their mobile telephones need not be near a television in order to play the game. More specifically, the users playing the game may be at the baseball game watching the game in person or might not be watching the baseball game at all. In either case, the users can still play the game and receive advertisements. This logic is also applicable for users replying to an email to provide their selection or supplying their selection data into a form via the Internet.

In addition to the above, each baseball game may have an associated advertiser referred to herein as a sponsor. The identity of the sponsor (e.g., the sponsor's trademark, name, product, service, etc.) may be displayed on the web page used by users to supply their selection data, included in the notification email, discussed by commentators during the pre-game show, included as part of the interactive content (e.g., ticker or interactive game), and/or displayed in the notification text message. In addition to identifying the sponsor, these communications may also convey a message that includes an incentive (or request) to the users to take an action. For example, the message to mobile phone users (included as part of the notification text message or subsequent thereto) may state: "Send a reply to this text message during any commercial of the sponsor and receive a bonus." The users who reply to the notification text message within sixty seconds of the broadcast of any of the sponsor's commercials receive the bonus. In this embodiment, each user is allowed to respond only once. If there are more responses sent by a user, only the first response is counted by the server 15*a*.

In this embodiment, each user that sends in a valid text message reply (within the time frame allowed) will receive a Bonus Hit, plus the point value associated with the awarded hit. In this embodiment, the Bonus Hit is randomly selected as either a single, double, triple, and homerun in a weighted manner that reflects the likelihood that each type of hit will occur. For example, the server 15*a* may determine the approximate times a single, double, triple and homerun is hit during any given season, determine the odds of each type of hit occurring for a given batter, and calculate how many of each will occur per 1000 at-bats (e.g., approximately 890 singles, 60 doubles, 5 triples and 45 homeruns.), which is then applied on a per thousand user basis. The server 15*a* then randomly applies the results per thousand users. The selected Bonus Hit for a user can be applied to their play for the Hit-for-a-Cycle game play for that game. If a player has correctly identified the innings for three of the cycle hits, but incorrectly identified one type of hit (e.g., a double) and his or her Bonus Hit is a Single, then the extra points are the only added value of being awarded the Bonus Hit. If, however, the Bonus Hit is a double, not only are the bonus points awarded, but, this Bonus Hit can be applied to that game's hit cycle prediction and the user is a winner in the game because the user has identified the innings of three types of hits correctly and uses the awarded Bonus Hit (the double) for the one type of hit for which he or she identified the incorrect inning. Thus, this embodiment also provides an incentive to users to take an action and also provides a feedback to the advertisers (e.g., the sponsor) that the users are watching their commercial.

In order to motivate the users, one embodiment of the game offers weekly prizes to be given away for any week's high scorer. Additional points may also be awarded toward a user's seasonal point total for winning a weekly prize, which would not only encourage more game play, but in the case of a user that has missed some games during any given week, gives that user a reason to continue playing with the added benefit of allowing them to possibly recapture points that have been missed from the games not played.

The game can be used to establish loyalty through consistent play throughout the season through rewards. Each user's play and point total may be recorded for each baseball game. At certain times during the season, the users can be rewarded by being offered "special sponsored giveaways" at the stadium. Since the server 15 knows game-play consistency (how many and how often users play the game and reply during sponsor commercials) as well has having each user's mobile phone number (and/or email address), the operator may spontaneously create a give-away event to attract more users to buy tickets to a baseball game and alert them quickly (via their mobile number or email).

To also encourage season-long participation in the interactive games, sponsor's can convey a message of a prize such as high-value prizes to be given away during the last week of home play to the top scorer's for the season.

Figure 7:
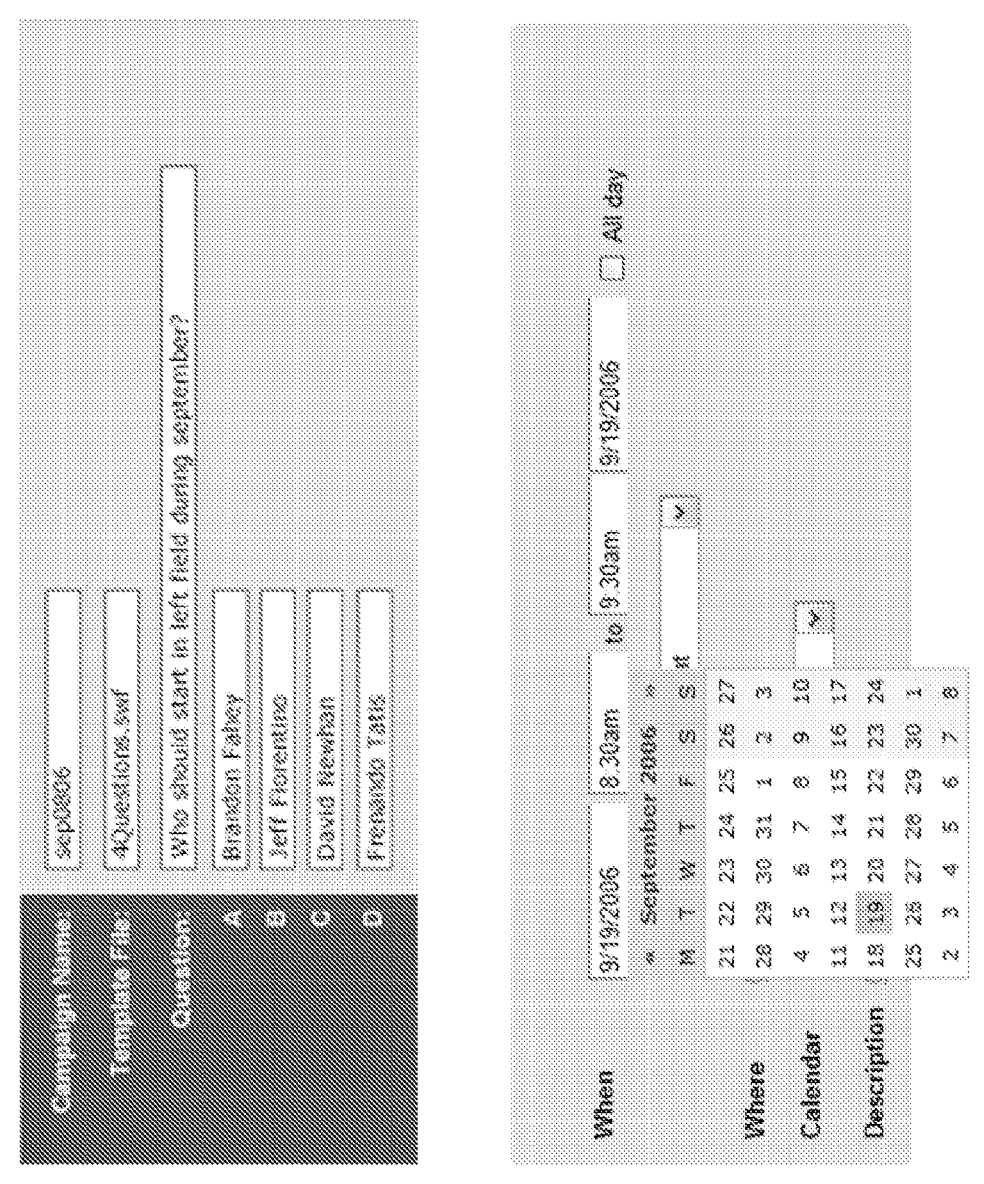

FIG. 7 illustrates an example of administration interfaces for managing interactive content that may be served by an interactive content server 15*b* to an administrator. The administrator may enter a campaign name, a template file, a question, and up to four answers that viewers may select. The template file identifies a file that determines the format (color, location, font, etc.) of the interactive content. In addition, the administrator may supply the dates and times to present the campaign (or question), where to present the campaign (or question)—such as the channel(s), geographical location(s), and/or television service providers—and a brief description of the campaign (or question). The data may then be stored on the server 15 and used to generate the interactive content presented to the viewers.

Figure 8A:
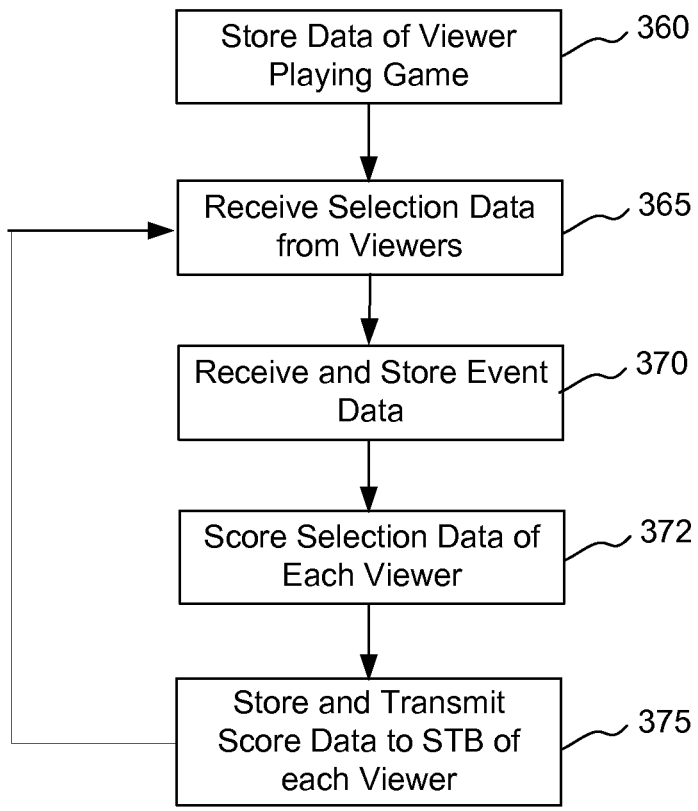
FIG. 8a illustrates processes of an example implementation for providing interactive content that facilitates play of a game related to events occurring in the programming content according to an example embodiment of the present invention.

FIG. 8*a* illustrates example processes for facilitating an interactive game that is scored based on events occurring in the television programming content. In one embodiment, the head end server 10 receives a request to play a game from a plurality of viewers. In other embodiments, the game and process of game data is facilitated by another server 17 or 15 and the head end server 10 routes data as needed. Information identifying each said viewer requesting to play the game (e.g., the viewer's user ID) is stored in memory of the server 10 at step 360 and subsequently associated with the score, selection data, and other data for facilitating game play. In this embodiment, the head end server 10 receives selection data from a plurality of viewers competing against each other in a group. The inputs may include viewer selections of one or more alternatives for scoring points such as those listed above and/or others. For example, the selection data from each of a plurality of viewers (competing against each other or forming a plurality of groups within which viewers complete) may include data of a selection of: what the next sporting event play is, what innings a particular type of hit will occur (e.g., homerun, triple, double, single), the results of the next sporting event play, the fantasy players selected, answers to questions included as part of a broadcast of a game show (e.g., a quiz show such as, for example, Jeopardy®), a person being voted off of a reality show, a person winning a game show, a person for whom the viewer casts a vote (e.g., a vote for the person to stay or be removed from a reality show), etc.

The selection data is received by the server 10 and stored in memory in association with the user ID of the viewer making the selections (e.g., indexed to the viewer's user ID) at step 365. The head end server 10 also stores information sufficient for identifying which subsets of the total number of viewers (groups of viewers) are competing against each other (if applicable).

As the television shows and/or sporting events progress, the selection data may be scored in substantially real time to determine the points scored (if any) by each selection of each viewer. Thus, at step 370 the head end server 10 (or other remote computer) typically will receive (and store) real time event data that includes digital data representing the results of events that occurred in programming content (e.g., television show or sporting event).

For example, at the end of an inning in a baseball game the event data may indicate the types of hits that occurred during that inning. After each football play, the even data may indicate the type of offensive and/or defensive play executed and the identity of other relevant events such as whether a touch down, field goal, first down, or other event occurred. Typically, the event data includes data sufficient to determine whether each item of selection data from each of the plurality of viewers was correct and/or should be accorded any points (and the quantity of such points).

It is worth noting that not all embodiments of the present invention and not all applications of other embodiments will utilize event data or scoring data. For example, where viewers are simply casting a vote for a person on a reality show, there may be no need to score the selection data (because there is no competition). Instead, the processing may include other steps such as tallying total votes associated with each person on the reality show.

In this example embodiment, the server 10 scores the selection data of each viewer based on the event data at step 372. In one embodiment, this processing includes simply comparing the selection data with event data to determine if they are substantially the same (e.g., did the answer selected by the viewer match the "correct" answer or did the play selected by the viewer match the play executed by the offense). In other applications more complex processing may be required. For example, wherein a viewer is playing a fantasy football game, the processing may require keeping track of the total yards for each player (athlete) and computing the cumulative points of each player (athlete) of each viewer. Thus, in the fantasy sports application, the viewers may establish their selections and the same selection data may be scored periodically such as after each play, at the end of each quarter, or at other desirable points in time. Thus, in this example embodiment the scoring includes determining the number of points (if any) to accord to selection data of a viewer. In various embodiments, the scoring may result in a reduction in the number of points previously awarded to a viewer. For more complex scoring, it may be desirable to use a remote server 15 or 17 such as one that is already designed to score the selection data (e.g., determine score for each fantasy player).

After a scoring of the selection data, at step 375 the head end server 10 stores the scoring data (e.g., the points scored and the total cumulative points) and transmits the appropriate scoring data as interactive content data to the set top box 20 of each viewer whose point score in their respective game has changed as a result of the scoring by the server 10. In other words, the server 10 sends the updated scores to the set top boxes of the viewers whose score has changed. Each set top box 20 receiving the scoring content stores the scoring data and displays the updated score.

Many of these processes may be repeated during game play until the television programming content and/or game play is finished. For example, processes 365-375 may be repeated until the end of the sporting event after which the computer transmits final score data to the set top boxes of all the participating viewers as well an win indication to those viewers who scored sufficiently high to have won (e.g., transmits information of a prize).

As discussed, some of the interactive screens may include an incentive button 331 and a message (or that includes a message) conveying an incentive to actuate the button 331 (or take some other action such as actuate a particular key on the remote control) when any commercial, or when a particular commercial, or during a particular portion of a commercial, is presented in the programming content box 301. As used herein such commercials form part of a commercial portion (e.g., formed of a plurality of distinct commercial segments) of the programming content sequenced between non-commercial segments of the programming content and typically will be part of the normal programming content broadcast. Such a commercial typically will be sequenced between non-commercial segments of the programming content (television show, movie, sporting event, etc.) even if the specific commercial itself immediately follows, and is followed immediately by, another commercial.

Normally, the advertiser will not know precisely how many viewers watched the television program during which their advertisement was presented. Additionally, the advertiser will not know how many viewers watched their television commercial. Thus, even if the television service provider knows that a set top box is tuned to a particular channel, the provider often will not know if the television is turned on and will not know if the viewer left the room during a particular commercial. As discussed, the present invention provides an incentive to viewers to watch a particular commercial while also determining that a viewer did watch a particular commercial by receiving an indication from the viewer that the viewer watched the commercial.

In one example embodiment, when the viewer actuates the incentive button 331 when a Pepsi® commercial is presented in the content box 301, the viewer will be provided an incentive as discussed above. In one example implementation, when the viewer actuates the incentive button 331, a notification is transmitted to the from the set top box 20 to the server 10 and may include information identifying the content (e.g., the commercial) being presented in the box 301 when the incentive button was actuated. The head end server 10 may then determine whether there is an incentive for actuating the incentive button 331 during the identified content such as by retrieving information from a database. If there is an incentive offered to the viewer for taking that action during presentation of that content, the head end server 10 processes the incentive by, for example, increasing the viewers score (and transmitting new scoring data to the viewer's set top box), discounting the user's television service provider's bill (e.g., the viewer's cable bill), or otherwise facilitating the associated incentive. In one example, the head end server 10 may transmit data to a remote computer to process the incentive to, for example, increase the viewer's frequent flier miles, increase loyalty points of the viewer, provide (e.g., mail, email, etc.) to the viewer with a coupon, etc.

The head end server 10 may also store in memory information identifying the viewers that actuated the incentive button 331 during the specified commercial. Such information (and the total number of viewers that watched the commercial) may be provided to the advertiser and used to bill the advertiser.

In other words, advertisers may pay the television service provider based on the number of viewers who confirm that they viewed a particular commercial (actuations of the incentive button), thereby allowing the service provider to offer pay per click type advertising on television broadcast network (in addition to, or instead of, conventional cost per advertising time slot television advertisements).

As discussed, the incentive may be any suitable incentive that might be sufficient to motivate at least some viewers to actuate the incentive button 331. For example, a first type of incentive may be related to an interactive game (e.g., fantasy sports game, the games illustrated in FIGS. 4 and 5, quiz show games, etc.), wherein the viewer is provided bonus points to his or her game score. In another example, the viewers may be offered (and provided) an incentive that is unrelated to the interactive content such as a coupon, discount, frequent flier miles, etc.

Digital video recorders (DVR) are offered by many television service providers (e.g., Comcast®, Verizon Fios®, etc.) to allow their customers to record programs that the customer cannot (or does not wish to) watch when program is received. When viewers watch program content that was previously recorded on their DVR, they often fast forward through commercials. Various embodiments of the present invention, however, may be used to offer an incentive to viewers to watch one or more commercials recorded with the recorded program content, instead of fast forwarding through the commercials. The interactive content associated with a particular television programming (and including the commercials) may be stored on the set top box (or on a remote computer) and retrieved when the recorded program is retrieved for presentation (or presented) to the viewer, or some combination thereof. For example, in one embodiment the set top box 20 stores all of the interactive screens when the television programming content is recorded. In another embodiment, the interactive content is retrieved (from storage) from the server 10 when the recorded television programming content is viewed by the viewer. In either case, when the viewer watches the recorded television program, the interactive content may convey a message offering an incentive to take some action during the presentation of a particular commercial (or any commercial). There are numerous well-known methods of synchronizing content that can be used to synchronize each interactive screen with the television programming content and therefore such descriptions are not provided here.

In this example, when the viewer actuates the incentive button 331 while watching the recorded commercial, a notification is transmitted to the head end and may include information identifying the content (e.g., the commercial) being presented in the content box 301. The head end server 10 then determines whether there is an incentive for actuating the incentive button 331 during the identified content such as by retrieving information from a database. If there is an incentive offered to the viewer taking that action during presentation of that content, the head end server 10 processes the incentive by, for example, increasing the viewer's score (and transmitting new scoring data to the viewer's set top box 20), discounting the viewer's television service provider's bill (e.g., the viewer's cable bill), or otherwise facilitating the associated incentive. In one example, the head end server 10 may transmit data to a remote computer to process the incentive to, for example, increase the viewer's frequent flier miles, increase loyalty points of the viewer, provide (e.g., mail, email, etc.) the viewer with a coupon, etc.

For interactive content that facilitates a game related to the television programming content, the server typically will have already stored (or have access to) all of the event data associated with the game (e.g., the answers to the questions asked in a game show). However, the viewer may still be permitted to play the game and, in some instances, compete with other viewers even though the viewer is not playing the game during receipt of a live broadcast of the television program. As the viewer makes selections, the selection data may be transmitted to the head end server 10 for scoring. The head end may then score the selection data based on the previously received event data (e.g., received hours or days previously) or, may transmit a request for the event data to a remote server 15 or 17 and subsequently receive the event data to score the viewer's selection data. Of course, in other embodiments, the head end server 10 acts more as a router by routing the viewer's selection data to another server 15 or 17 having access to the event data for scoring.

For clarity, DVRs may be used to schedule the recording of a television program (e.g., television show, movie, sporting event, etc.), immediately record a television show in response to a user input, and to pause television programming content, which results in a recording. Thus, a user may get a phone call while watching a live sporting event (or other television program) and decide to pause the live broadcast until his or her phone call is complete. When the user actuates the pause feature of the set top box, the set top box begins storing television programming content and simply pauses the audio-visual presentation (i.e., the audio-visual output to the television). In this embodiment, the set top box 20 also stores the interactive screens (and data) associated with the selected program content and presents them to the viewer (by outputting them to the television) when the user selects the play feature (to un-pause the program content) to resume presentation of the programming content and interactive game. Additionally, when implemented, the viewer will still receive the message conveying the incentive to watch a commercial and can still receive the incentive by taking the conveyed action at the appropriate time.

Figure 8B:
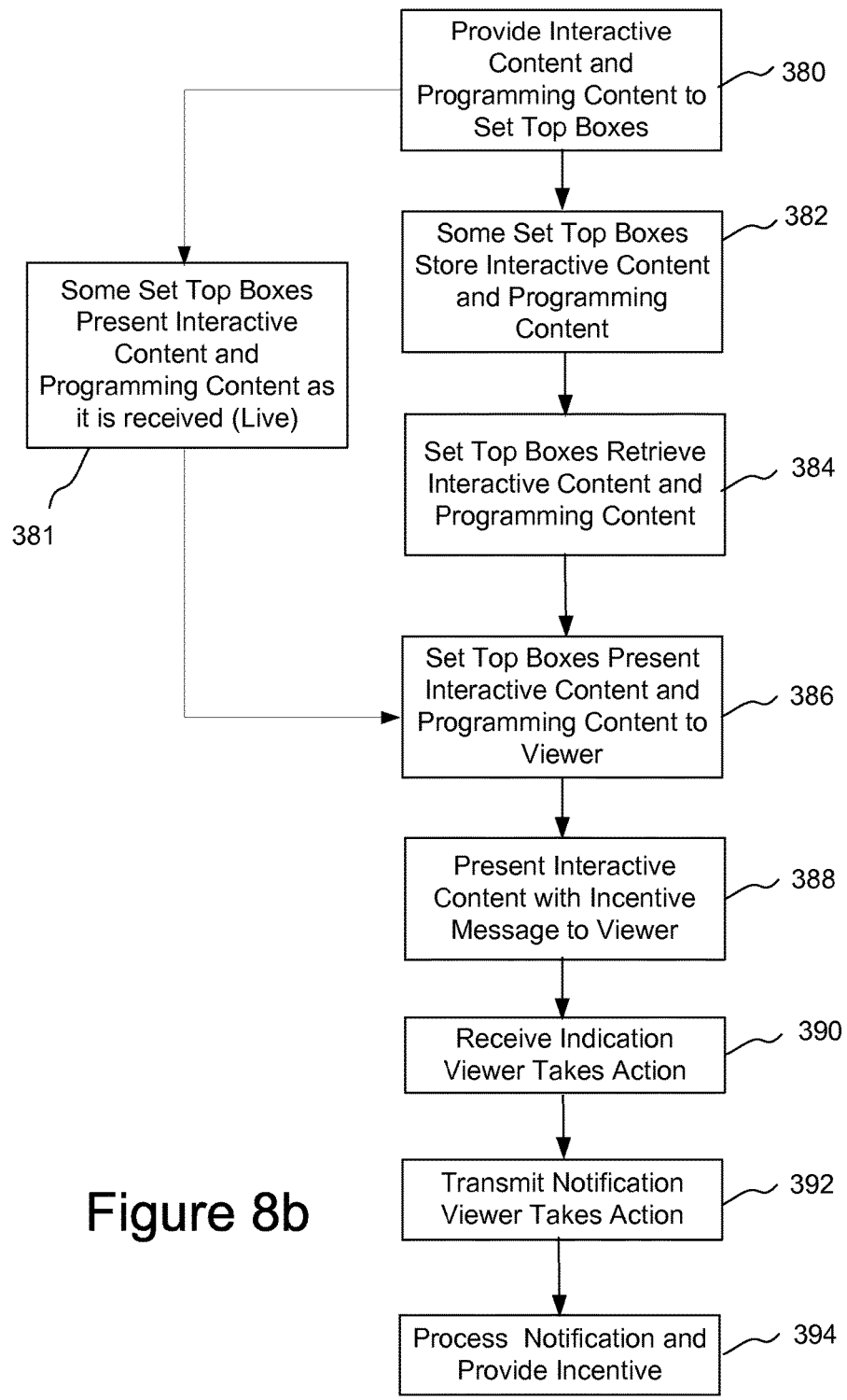
FIG. 8b illustrates processes of an example implementation for providing incentives to viewers for taking an action according to an example embodiment of the present invention.

Thus, referring to FIG. 8*b*, in some embodiments viewers can be offered and receive the incentive if (1) the interactive content and programming content are presented to the viewer as it is received by the set top box (live presentation to the viewer) or (2) the interactive content and programming content are recorded (due to a pause or scheduled recorded) by the set top box and subsequently retrieved and presented to the viewer. At step 380, the head end server 10 provides the interactive content and programming content to the plurality of set top boxes. As discussed, the interactive content may facilitate a game play among all or groups of viewers although not all embodiments of the present invention facilitate game play. At step 381, some of the set top boxes 20 present the interactive content and programming content to the viewer substantially as the content is received (live). However, other set top boxes may store the programming content (and in some embodiments the interactive content) at step 382. The content may be stored until the user elects to view the programming content. Thus, when the set top box 20 receives a user input indicating a request to view the programming content, the set top box 20 retrieves the programming content (and retrieves or requests the interactive content) at step 384. The user input indicating a request to view the content may comprise (1) the user un-pauses the paused content; or (2) the user uses an electronic program guide to select the recorded content (e.g., such as when the program was selected for recordation instead of paused). At step 386, both groups of set top boxes present the interactive content and programming content. It is worth noting that while both groups may perform this step 386, typically they will not perform step 386 simultaneously because of the recordation by the group of set top boxes that perform steps 382-384 will delay them. At step 388, the message conveying an incentive to take an action is presented by the interactive content. At step 390, one or more set top boxes receive an indication (actuation of a button on the remote control) that the user took an action. At step 392, those set top boxes transmit a notification indicating that the viewer took an action. Finally, at step 394, the head end server 10 receives the notifications, processes them, and, if applicable, provides the incentive to the appropriate viewers. In some embodiments, the set top box processes the action to ensure that the action taken includes the action for which the incentive was offered (e.g., ensures that the user actuated the correct button during the correct commercial). In other embodiments, a remote server 15 or 17 performs the processing.

In the above embodiments, the viewer has been offered an incentive to take an action during a specified commercial. In other embodiments, the viewer may be offered (and receive) the incentive (or a greater incentive than other viewers) if he or she is the first of a predetermined number of viewers to take the action during the selected commercial (e.g., only the first 100 viewers (first 25% of viewers) get the incentive), takes the action during a specified portion of a commercial (e.g., while the actor is drinking the Pepsi), and/or takes the suggested action during the commercial upon (and concurrently with) a notification presented in the interactive content area. Alternately, the viewer may be offered an incentive to take an action during a portion of a non-commercial segment of the television programming content (e.g., during a sitcom, during a sporting event, or during a movie).

Instead of providing an incentive to take an action during a commercial to determine whether the viewer watches the commercial, the viewer may be offered an incentive (or may participate in game play) that involves correctly answering one or more questions about one or more commercials that were previously presented. More specifically, in one example, after a commercial (and during a subsequent commercial or a non-commercial segment) the interactive content may convey a question about the commercial that requires that the user recall some aspect (e.g., visual and/or audible aspect) of the commercial. For example, the question may ask the user to supply the color of an article of clothing (e.g., the actor's tie) worn by an actor in the commercial, the number of actors in the commercial, the name of a character in the commercial, the product advertised in the commercial, a discount offered in the commercial, a location depicted or cited in the commercial, etc. The question may be posed in any suitable format such as, for example, in a multiple choice format. The viewer may be provided the incentive (or score points) if the user answers the question correctly. Thus, in game play this "recall" format, in itself, may provide entertainment to viewers and allow viewers to compete against each other in groups to determine the viewer(s) having the most correct answers. In addition, this format requires that the viewers give greater attention to the commercial thereby providing assurance to the advertiser that the commercial was watched by the viewers correctly answering the question. The answers to the questions may be scored in a manner similar to the other selection data described above. In addition, the recall format may be used to ask the viewers questions about non-commercial television content.

FIGS. 9a-i show how the user may navigate through the wagering screens of an example embodiment (which illustrates an off track betting (OTB) platform although other types of wagering may also be provided). The user may select to open an account, see a demo account, see the user's account history, and/or place bets using the user's account. To place bets or see the account history, the user must login by providing an account number and pin number via the interface of FIG. 9b (which may be different that the user name and password supplied to the set top box). The account number and pin number may be received by the server 10 and verified as valid account information by accessing an OTB database.

Figure 9A:
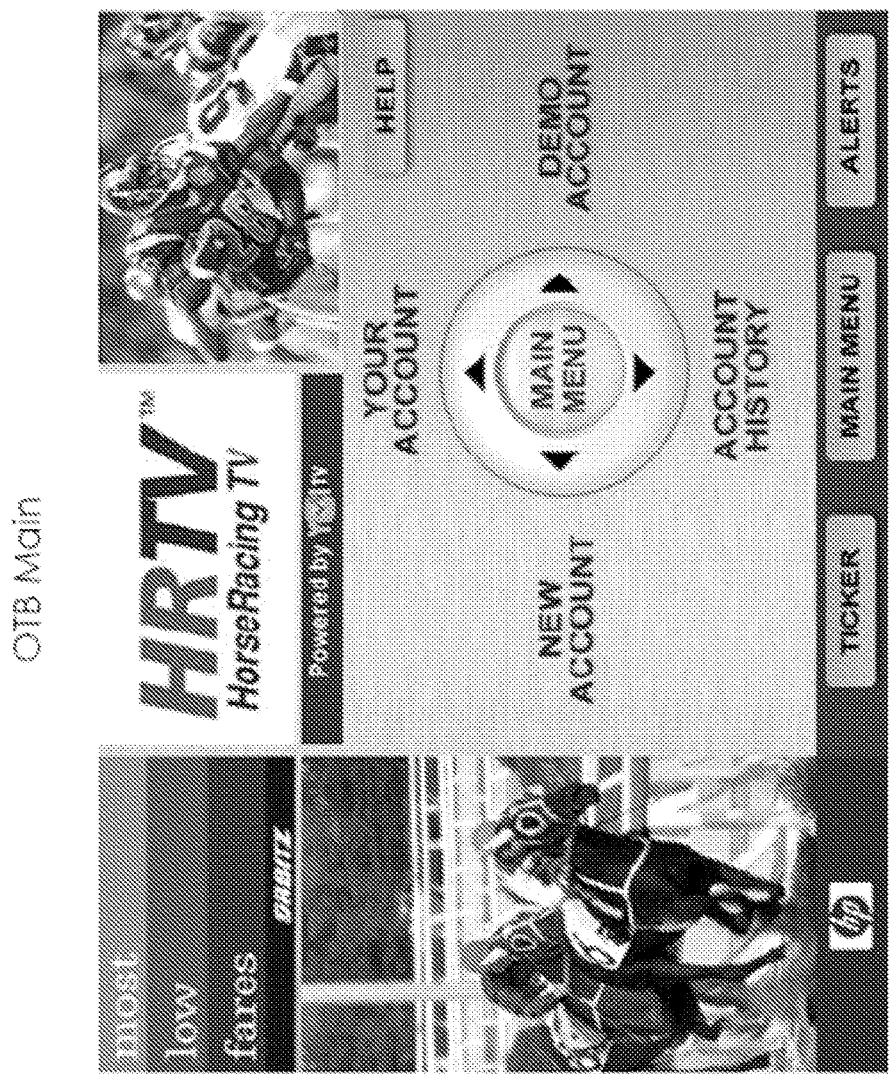
FIGS. 9a-i illustrate example interfaces for receiving user inputs and providing content relating to a wagering platform according to an example embodiment of the present invention.
Figure 9B:
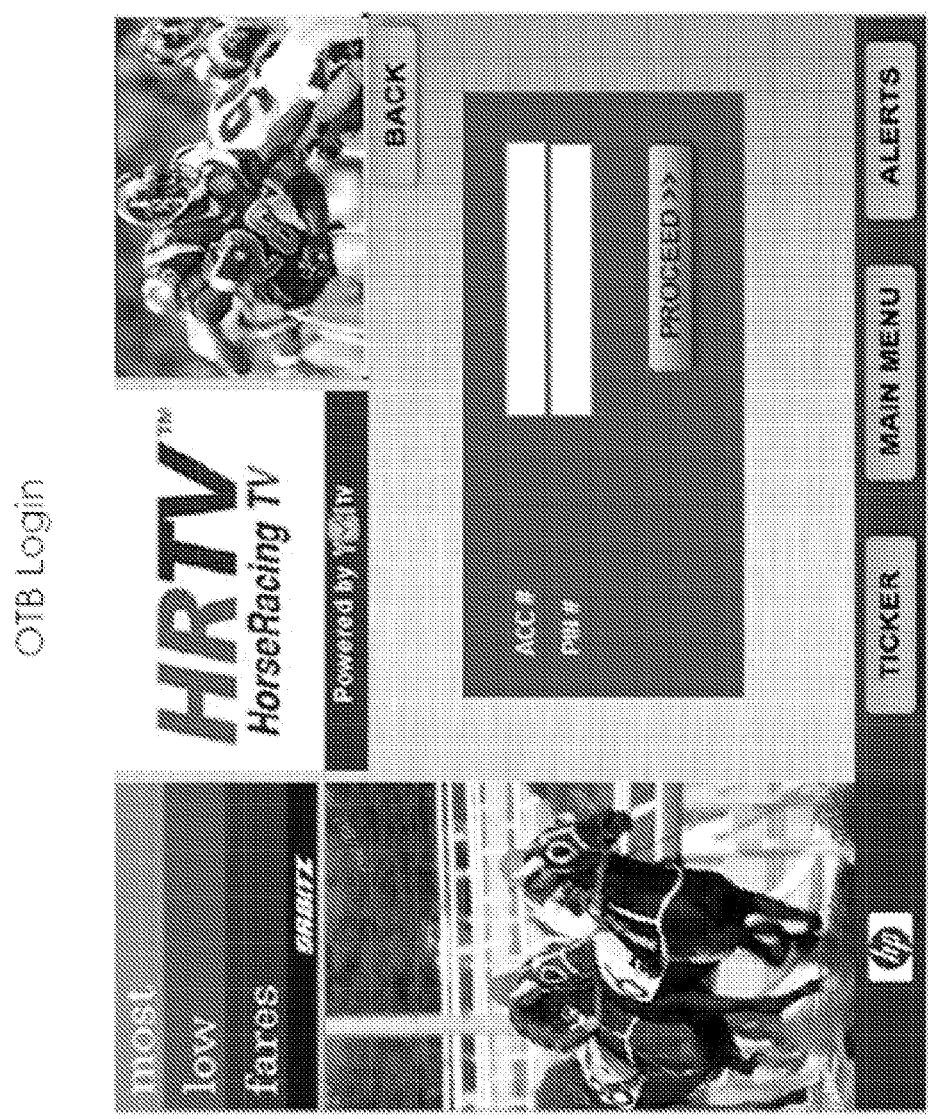
Figure 9C:
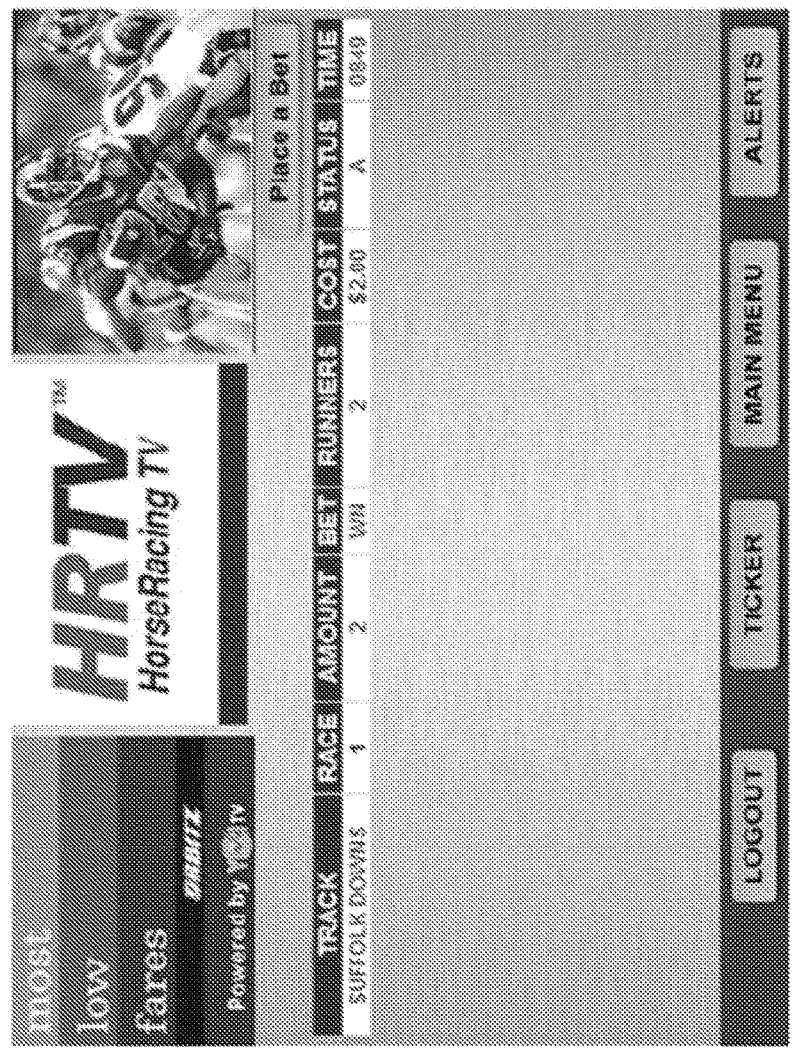
Figure 9D:
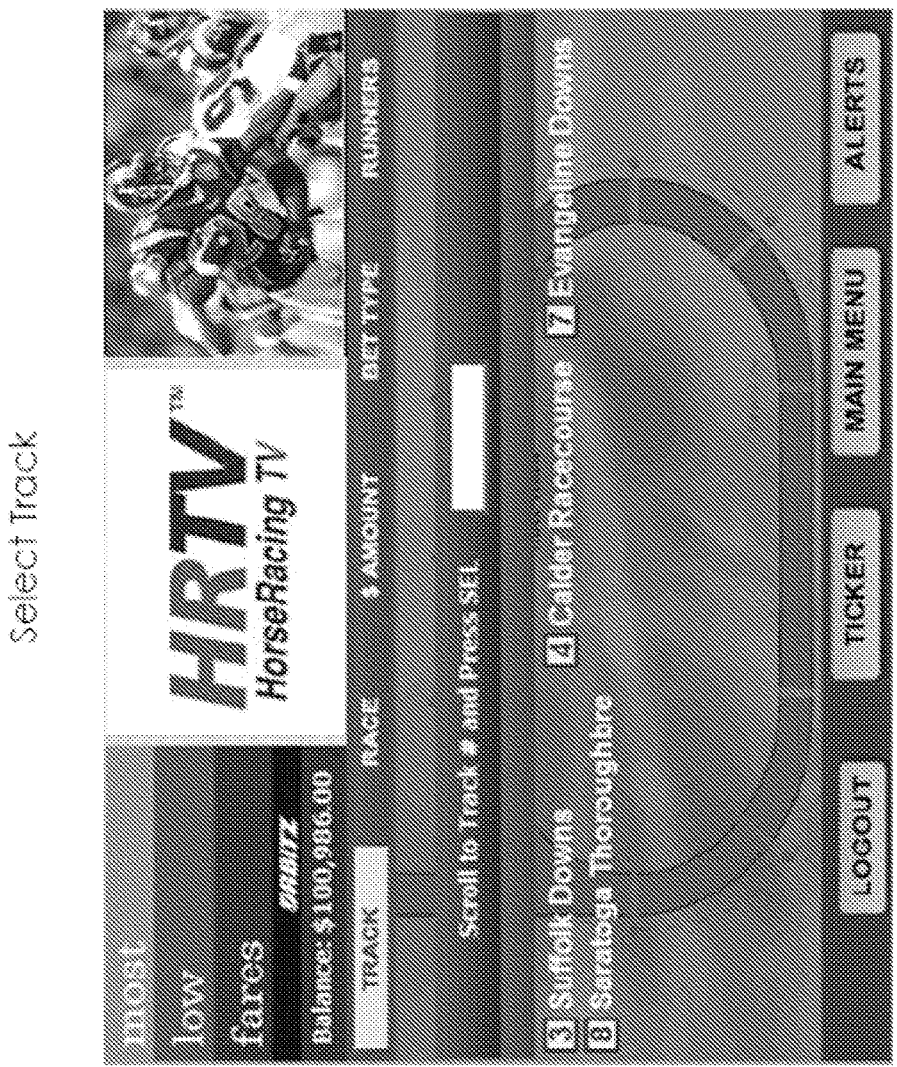
Figure 9E:
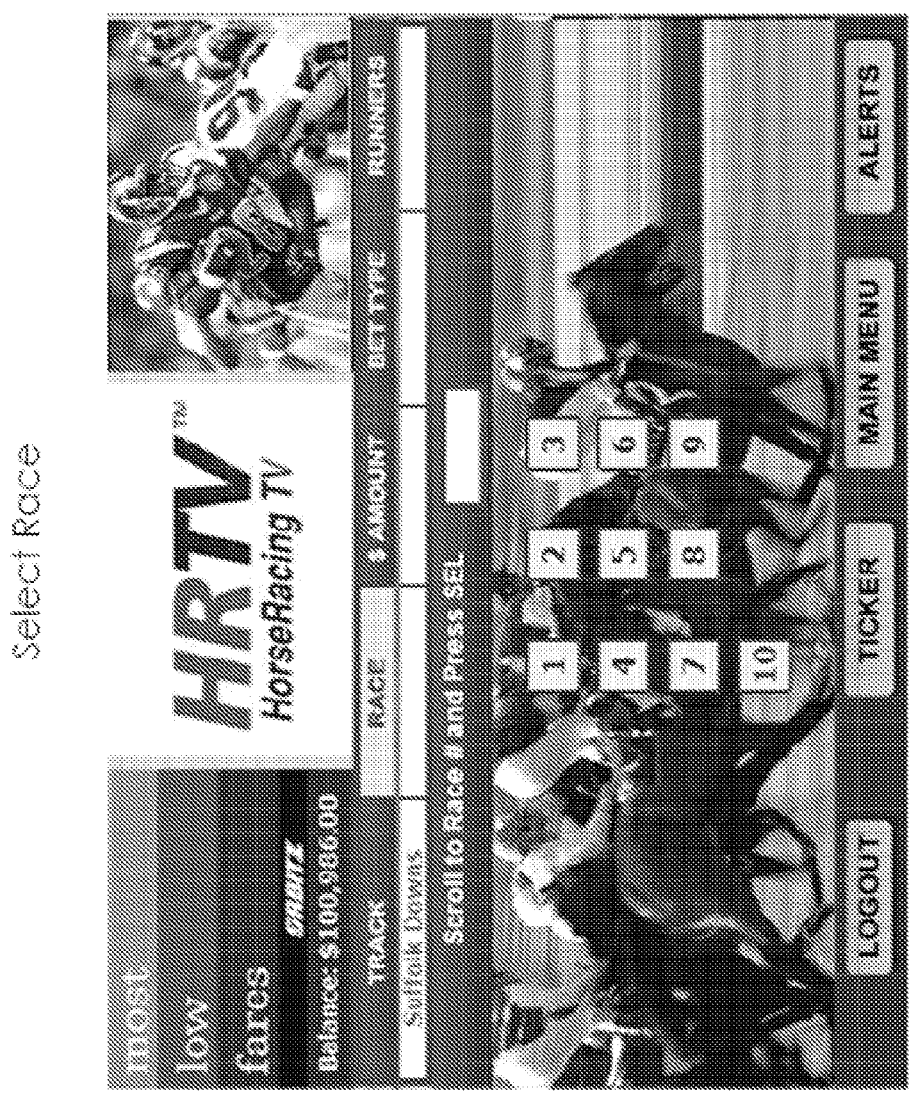
Figure 9F:
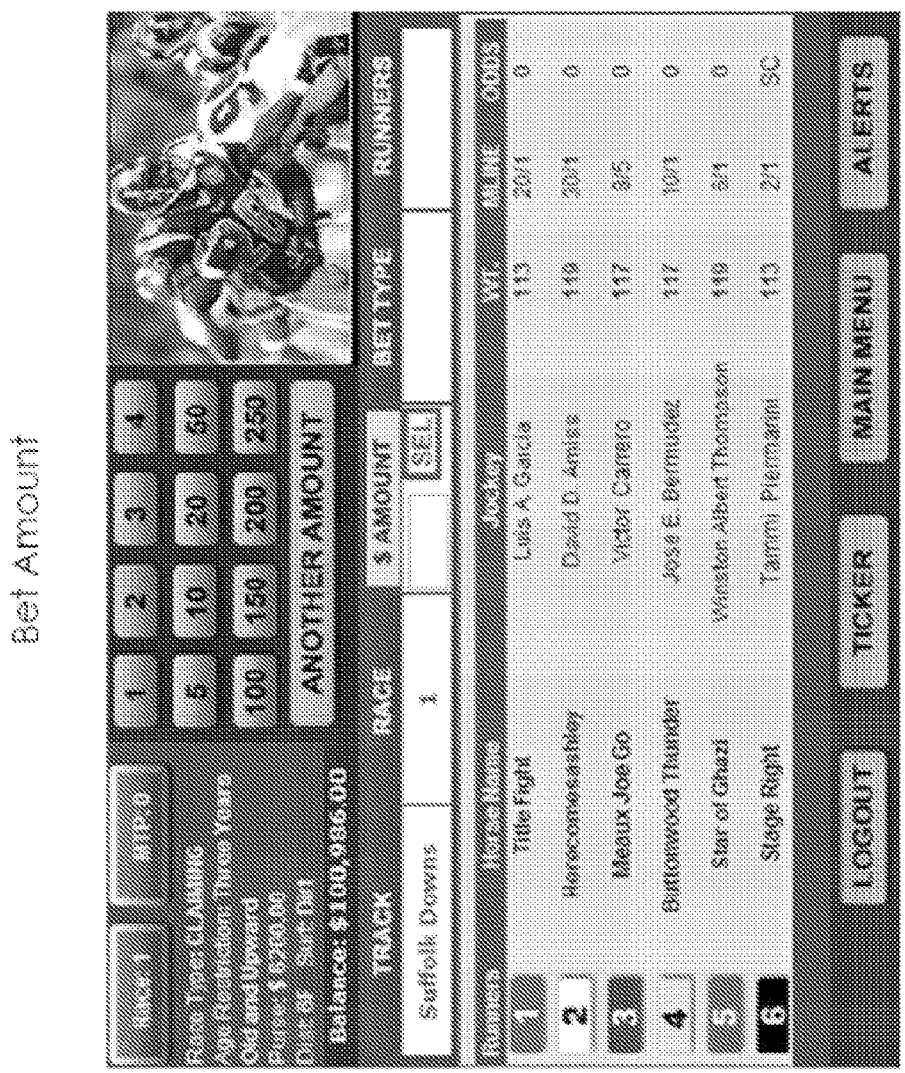
Figure 9G:
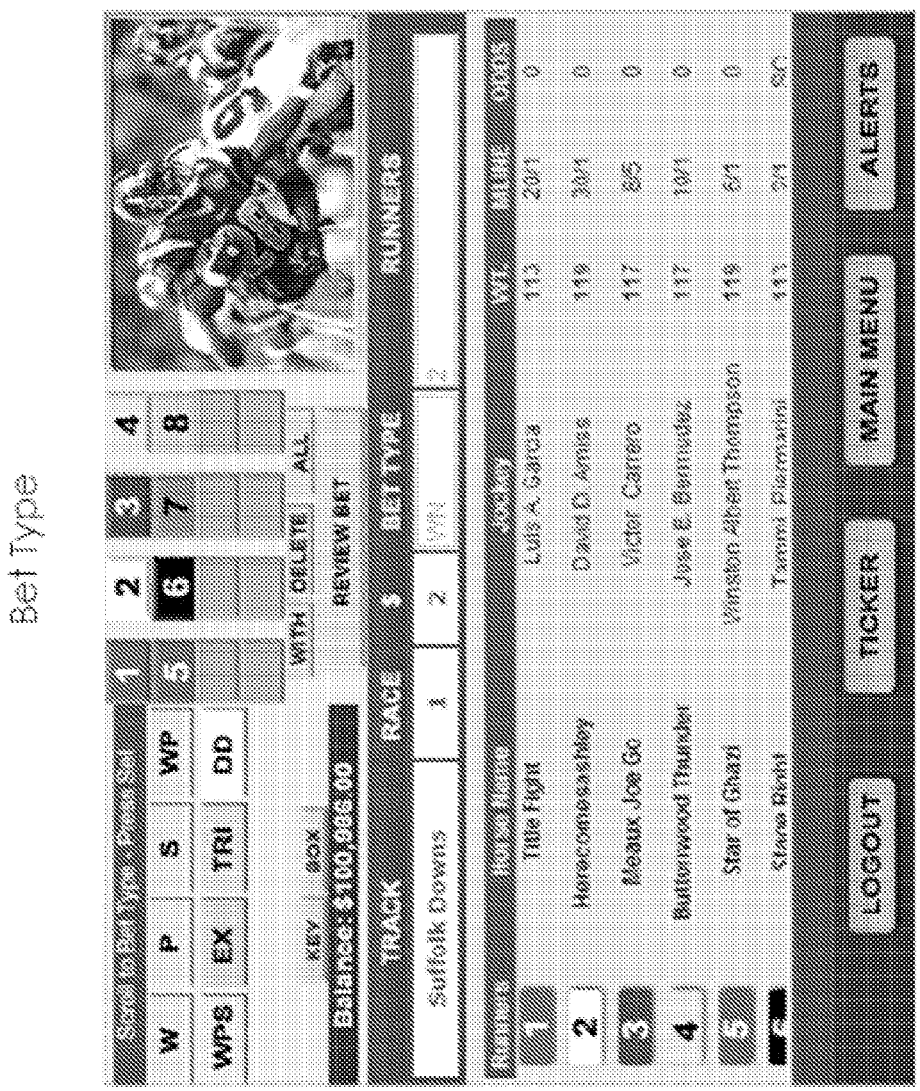
Figure 9H:
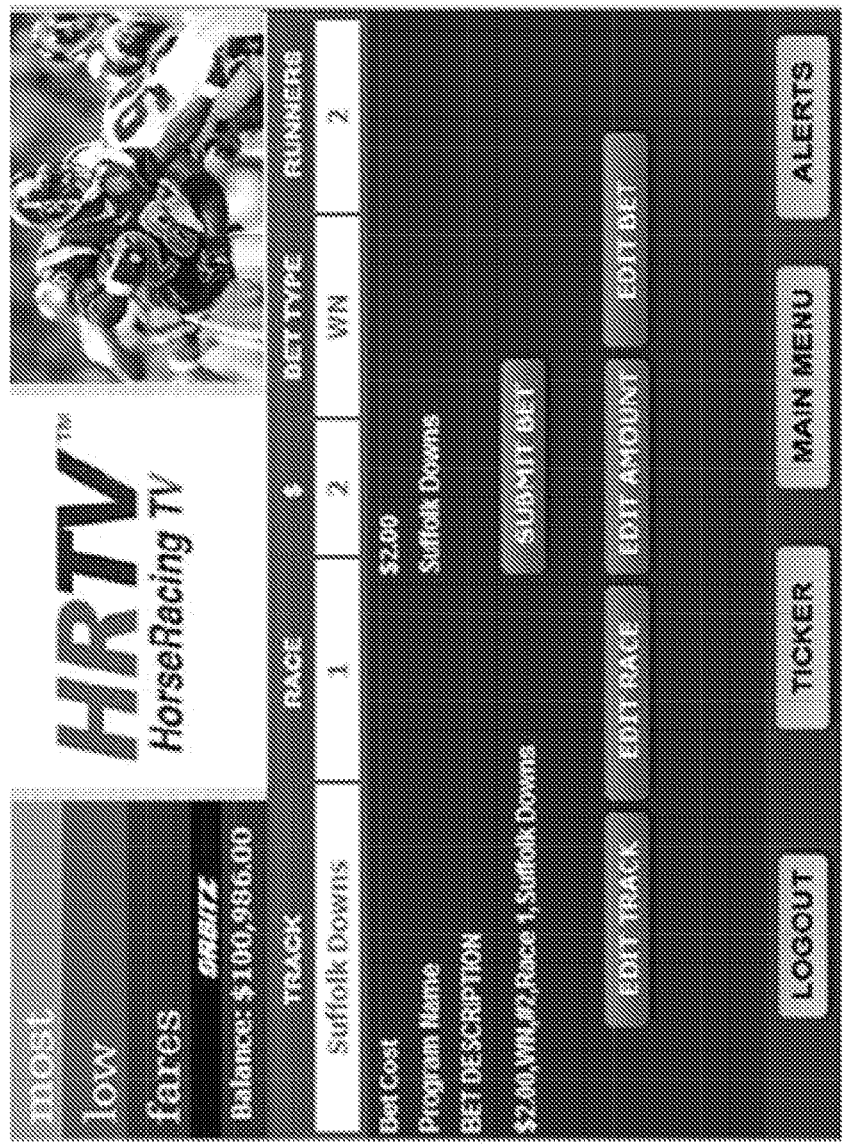
Figure 9I:
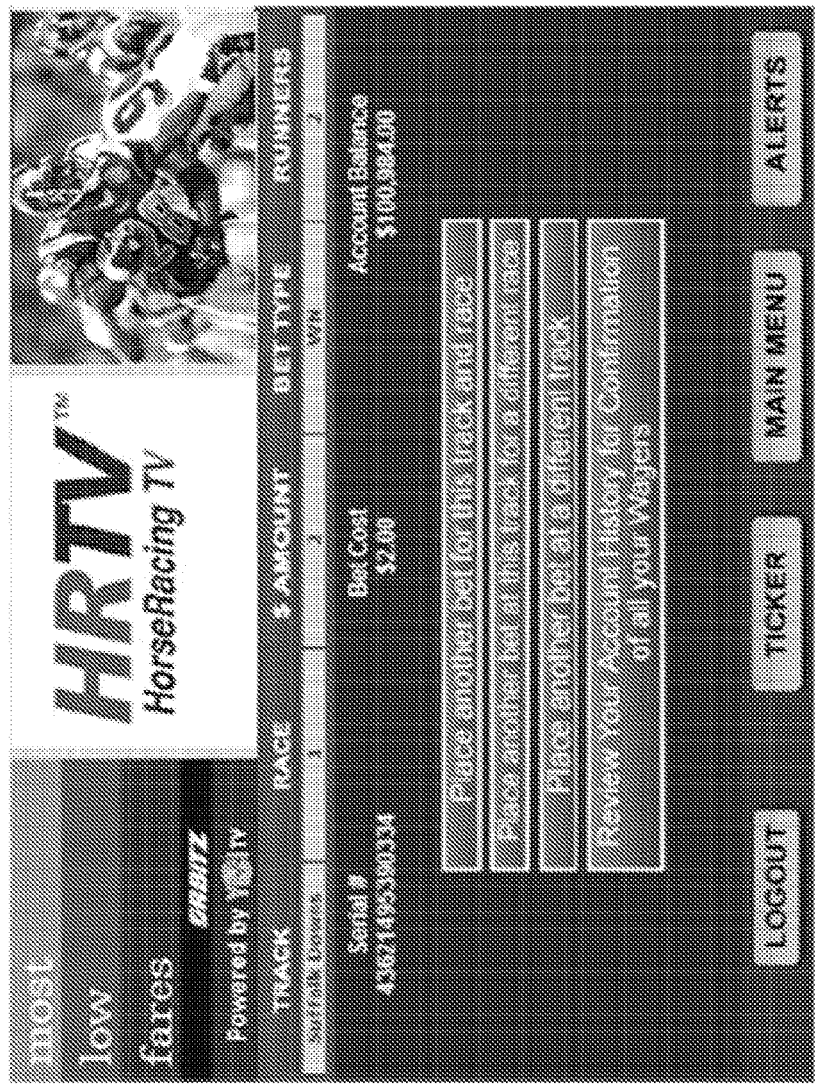

The user may select a track via the interface of FIG. 9d, a race number via the interface of FIG. 9e, an amount to bet via the interface of FIG. 9f, a bet type via the interface of FIG. 9g, and then review and submit the bet via the interface of FIG. 9h. The wagering information provided by the user via the interfaces of FIGS. 9d-h may be transmitted to the server 10. In this example, the user provided interactive wagering data may be received by the server 10 and subsequently transmitted to another server 15, 17. The server 10 may then receive a response from the other server 15, 17 and transmit response information to the user's set top box for display. The user may then receive updates (or a live broadcast) of the race.

One of the main issues with any content and transaction service is the level of security. There are various levels of security built in to this example OTB TV Wagering system. The first is in the "front-end" or set-top box, each user must input their account and password to access the system. If the user decides to make a wager, the password must again be supplied, before the wager can be processed. Lack of activity on the service (i.e., no of inputs to the set top box for a predetermined time period) will also prompt a "service time-out", whereupon re-entry of the password is required to restart the session.

A secure encryption layer is into the set-top box software. Thus, any wagering communication between the set top box and the server (or cable head end) is handled through this software.

When a wager is made by the user, in some embodiments there may be a need for information about the wager to pass through the cable network and into the Tote System, which resides rests outside of the cable network. To facilitate this communication, a VPN or Virtual Private Network, may be set up between the server 20 and the tote company. For example, a "private" telephone line may be used to connect both entities. At each end, the line may be attached to a router, which communicates only with each other, therefore eliminating unwanted third party entrance.

All wagers made by the users also may be recorded by an independent, secure third party depository. Thus, confirmation of the wager from the Tote system is provided to the user (via the server) and also to the third party depository which logs the confirmation. All electronic confirmations are transmitted to and the server 10. Customers may request and receive information of past wagers for up to 30 days after the wager was made via the account history interface of FIG. 9c.

For Customers who desire to "open" an account for wagering through the TV wagering system, an interface with a secure form (https) is provided on-screen (not shown). Information fields will be provided as required by existing OTB rules and regulations. All user input data is encrypted and matched against the user data currently on file with the cable operator to ensure that only cable customers may use the OTB application. Thus, if the data supplied by the user for a new OTB account does not match information from a database of the cable operator that lists the residents at the cable customers, the server 10 may deny the new account.

Existing OTB customers who become cable customer may be required to input their current account number and password to the set top box to be supplied to the server. If requested by OTB, a "Visitor" module may be included to the interface, which allows non-household users to wager through the cable customer's set-top box. In this embodiment, the visitor would register, as set forth in the "Existing Accounts" section, to allow the server 10 to recognize a visitor account.

The user may also fund his or her wagering account via the set top box. Specifically, monies may be transferred to a user's account via secure credit card transaction. An money transfer interface may be provided to the user, which, as with wagers, requires the user enter a password before a transfer can be completed.

There are, in existence, many "Internet" gambling sites which promote and facilitate horse wagering. These sites are commonly accessed through computers, and are open to the public. These sites are neither registered nor sanctioned by State governments. In contrast, the TV Wagering System of the present invention may be a completely closed environment that the public cannot access a home computer. Furthermore, all communications between the server, cable company, and outside sources may be communicated via a highly secure Virtual Private Network (VPN) encryption technologies.

The cable network also may be used to provide wagering via other communication methods. In one example use of the OTB platform, an existing OTB telephone account user wants to make a wager. The user calls from their home phone, which has just been converted to cable VOIP telephone service. The user calls the OTB operator, places the wager, gets a confirmation and hangs up. The user has just used the same data transport mechanism the cable system uses to place the bet. The only difference is that instead of a voice making the wager with an operator, a string of data makes the bet directly with the tote system. This communication, however, may be accomplished via a private and secure network and outside of a PSTN and the internet.

Figure 10:
FIG. 10 illustrates an example interface for navigating to one or more channels according to an example embodiment of the present invention.

FIG. 10 shows an example of an interactive channel screen which allows the user to select one of a plurality channels. In response to selection of any of the channels, the set top box itself will change the displayed television programming to the selected channel. Thus, this example screen provides an interface for allowing the user to change the television programming.

In another embodiment of the invention (not shown), the user may watch a television program and elect to see multiple choice questions displayed on the screen (e.g., at the top, bottom, or as an overlay). For example, while watching Jeopardy®, another game show (e.g., Name that Tune, Wheel of Fortune, Who Wants to Be a Millionaire®, etc.) or other type of show, the user may elect to see multiple choice questions (or questions in another format) that correspond to the question asked of the contestants on the television program. The user may answer the questions via the input device. The set top box 20 may then transmit the user responses to the server 10, which may transmit the data to another server 15, 17, either of which may tally the scores of all the users competing. The multiple choice or other game data may be sent in the vertical blanking interval or via other suitable means.

Thus, the present invention may be used to facilitate and/or implement advertising (including but not limited to, interactive and non-interactive being related or unrelated to the program content), wagering (including but not limited to horse wagering, baseball, football, basketball, hockey, tennis, golf, car racing, dog races, soccer, lacrosse and all fantasy sports games (including but not limited to horse wagering, baseball, football, basketball, hockey, tennis, golf, car racing, dog races, soccer, lacrosse). In addition, one or more embodiments may be used to facilitate and/or implement purchase transactions (buy and/or sell), and other transactions (exchange products/services, get information, post information, etc.) or applications not necessarily related to sports (including fantasy sports) such as financial transactions, weather, news, food, dining, beverages (alcoholic and non-alcoholic), personals, real estate, automotive, travel, entertainment, music, lottery, and games (e.g., interactive gaming, including participating in, which may include wagering), but not limited to, all forms of card games (such as poker, blackjack, solitaire, baccarat, pinochle, gin, rummy) slot games, trivia, games of chance, roulette, keno, slingo, bingo, name that tune, wheel of fortune, dominions, dice (craps) where individuals or groups can participate and compete against one another.

In addition, one or more embodiments may be used to facilitate and/or implement the purchase or exchange of music or video (files or data) between video (and/or audio) storage devices for personal, commercial, hotels, residential buildings and communities or home use, including but not limited to MP3 players, iPods®, PDAs etc. Many set top boxes include USB ports, to which a storage device may be connected to receive (or provide) the data or files (e.g., received and purchased from iTunes® via an advertisement displayed on a screen).

While the present invention has been described in the context of a cable television system, one or more embodiments may be modified by one skilled in the art to function in other telecommunications networks, including interactive and non-interactive broadcasting, programming, and infrastructure services, and applications to mobile telephone networks (e.g., cellular telephones), DBS satellite networks, microwave systems, DBS satellite systems, PDA networks (e.g., Blackberry® network), WiFi networks, WiMax networks, future version of these networks, and other networks, and employ their associated products including their web servers, computer systems, and all related forms of communication devices and media including but not limited to DSL, T1, T3, OC3, HFC, Fios, Lightspeed, Fiber, coax cable, and copper.

Thus, operation of the server may be accomplished via a server-based application platform for interactive television that "acts" as an EPG (electronic program guide) for interactive channels. In one example embodiment, the interactive channels and/or interactive advertisements (e.g., commercials) may be created (or communicated) using the cable provider's sidebands. The server application may include coding or scripting to facilitate the timing mechanisms used to coordinate (e.g., synchronize presentation of) advertising and/or interactivity (with each other or with television programming). In addition, an "A-sync" purchasing mechanism may be used to provide the user with one ID and password for transacting (e.g., buy, sell, exchange) throughout the network services, interactive channels and interactive commercials. This method may allow the cable provider company to be taken out of the transaction loop.

In some embodiments, a monitor or computer system (with a display device) may act as a television and provide the presentation of the television programming and interfaces to the user. Thus, while the embodiments herein are described in the context of a set top box other devices can be used to implement various embodiments of the present invention. The term set-top box generally is used to describe a device that connects to a television and some external source of signal, and converts the signal into content that can be displayed on the display. The signal source might be an Ethernet cable, a satellite dish, a coaxial cable, a telephone line (including DSL connections), Broadband over Power Line, or even an ordinary VHF or UHF antenna. A set top box connected to a television's (or video recorder device's) input connector typically feeds a baseband television signal and may act as the television's tuner (allowing the user to select the television programming). In addition, the set top box may act as a video recording device. In addition, in some embodiments the set top box also may be integrated into the television of other display device (e.g., a computer connected to a cable modem, satellite receiver, or the internet). However, it will be evident to those skilled in the art that the present invention is not limited to a set top box but would work equally as well via hardware and software embodied in, or as, other devices.

In some instances, the pulled data or pushed data may be communicated over a data path that includes a public data network (e.g., the internet) or a private network (e.g., VPN). For example, in one embodiment, pulled data is received via the Internet and the pushed data is received via a private network.

It is to be understood that the foregoing illustrative embodiments have been provided merely for the purpose of explanation and are in no way to be construed as limiting of the invention. Words used herein are words of description and illustration, rather than words of limitation. In addition, the advantages and objectives described herein may not be realized by each and every embodiment practicing the present invention. Further, although the invention has been described herein with reference to particular structure, materials and/or embodiments, the invention is not intended to be limited to the particulars disclosed herein. Rather, the invention extends to all functionally equivalent structures, methods and uses, such as are within the scope of the appended claims. Those skilled in the art, having the benefit of the teachings of this specification, may affect numerous modifications thereto and changes may be made without departing from the scope and spirit of the invention.

What is claimed is:

1. A method of providing television programming content and interactive data services via a plurality of communication devices disposed in a plurality of customer premises and wherein each communication device is configured to cause a display device to display television programming content and interactive content to a participant in a contest, comprising:
    providing interactive content and programming content from a server having a memory to each of the plurality of communication devices connected to the server for presentation to the participants in the contest, wherein at least one of the plurality of communication devices is a mobile telephone and at least one of the plurality of communication devices is a set top box, wherein the interactive content includes visual content facilitating the contest and is configured to be displayed, at least in some instances, concurrently with the programming content, wherein the participants in the contest are each accorded a score in the contest that is dependent on one or more events that occur in the programming content to facilitate play of the contest between the participants;
    providing a commercial from the server to each of the plurality of communication devices for presentation of the commercial to the participants;
    receiving selection data by the server that comprises data of one or more selections of contest play from each of a plurality of the participants participating in the contest;
    storing selection data of each of the plurality of participants in the memory in association with the participant;
    receiving event data from the server that comprises data of one or more events having occurred in the programming content;
    for each participant of the plurality of participants, the server determining a score data comprising a number of points based on the selection data by the participant and the received event data;
    for each of the participants of the plurality of participants, the server providing that participant's score data to the communication device of the participant for presentation to the participant as part of the interactive content;
    providing a message to the plurality of communication devices from the server for presentation as part of the interactive content to the participants, wherein the message conveys an incentive comprising bonus points to take a first action during when the commercial is presented;
    receiving incentive data from the plurality of communication devices by the server, wherein the incentive data provides an indication that the participant associated with the communication device performed the first action;
    transmitting a notification to the plurality of communication devices from the server, wherein the notification comprises information for display to the participant that the incentive is awarded;
    determining by the server a number of the participants that watched the commercial based on the number of incentives awarded;
    determining by the server a winner based on the total number of the points and the bonus points; and
    providing an advertiser with an indication of the number of the participants that watched the commercial.

2. The method according to claim 1, wherein the contest comprises a fantasy sports game.

3. The method according to claim 1, wherein television programming content comprises a sporting event.

4. The method according to claim 1, wherein the interactive content is displayed on the display in the form of a ticker.

5. The method according to claim 1, wherein the interactive content is displayed on the display in form of an alert.

6. A method of providing television programming content and interactive data services via a plurality of communication devices disposed in a plurality of customer premises and wherein each communication device is configured to cause a display device to display television programming content and interactive content to a participant in a contest, comprising:
    providing interactive content and programming content from a server having a memory to each of the plurality of communication devices connected to the server for presentation to the participants in the contest, wherein at least one of the plurality of communication devices is a mobile telephone and at least one of the plurality of communication devices is a set top box, wherein the interactive content includes visual content facilitating the contest and is configured to be displayed, at least in some instances, concurrently with the programming content, wherein the participants in the contest are each accorded a score in the contest that is dependent on one or more events that occur in the programming content;
    providing a commercial to each of the plurality of communication devices from the server for presentation of the commercial to the participants;
    receiving selection data by the server that comprises data of one or more selections of contest play from each of a plurality of participants participating in the contest;
    storing selection data of each of the plurality of participants in the memory in association with the participant;

receiving event data from the server that comprises data of one or more events having occurred in the programming content; for each of the participants, determining by the server a score data comprising a number of points based on the selection data by the participant and the received event data;

for each of the participants of the plurality of participants, providing from the server the participant's score data to the communication device of that participant for presentation to the participant as part of the interactive content;

providing from the server a message to the plurality of communication devices for presentation as part of the interactive content to the participants, wherein the message conveys an incentive comprising bonus points to take a first action during when the commercial is presented;

receiving incentive data from the plurality of communication devices from the server, wherein the incentive data provides an indication that the participant associated with the communication device performed the first action;

transmitting from the server a notification to the plurality of communication devices, wherein the notification comprises information for display to the participant that the incentive is awarded;

determining by the server a number of the participants that watched the commercial based on the number of incentives awarded;

determining by the servers a winner based on the total number of the points and the bonus points; and providing an advertiser with an indication of the number of the participants that watched the commercial, wherein the contest is a fantasy sports game and the television content is a sporting event.

7. The method according to claim 6, wherein the interactive content is displayed on the display in the form of a ticker.

8. The method according to claim 6, wherein the interactive content is displayed on the display in form of an alert.

* * * * *